(12) United States Patent
Abdelghaffar et al.

(10) Patent No.: US 12,245,157 B2
(45) Date of Patent: Mar. 4, 2025

(54) SOUNDING REFERENCE SIGNAL POWER CONTROL WITH NON-SCHEDULING DOWNLINK CONTROL INFORMATION

(71) Applicant: QUALCOMM Incorporated, San Diego, CA (US)

(72) Inventors: Muhammad Sayed Khairy Abdelghaffar, San Jose, CA (US); Gokul Sridharan, Sunnyvale, CA (US); Yi Huang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 314 days.

(21) Appl. No.: 17/713,068

(22) Filed: Apr. 4, 2022

(65) Prior Publication Data

US 2022/0330161 A1 Oct. 13, 2022

Related U.S. Application Data

(60) Provisional application No. 63/171,501, filed on Apr. 6, 2021.

(51) Int. Cl.
*H04W 52/14* (2009.01)
*H04L 5/00* (2006.01)
(Continued)

(52) U.S. Cl.
CPC ......... *H04W 52/143* (2013.01); *H04L 5/0051* (2013.01); *H04W 52/367* (2013.01); *H04W 72/1263* (2013.01)

(58) Field of Classification Search
CPC ............. H04W 52/143; H04W 52/367; H04W 72/1263; H04W 52/08; H04W 52/58;
(Continued)

(56) References Cited

U.S. PATENT DOCUMENTS

2014/0219232 A1 8/2014 Takeda et al.
2023/0344585 A1* 10/2023 Liu ..................... H04W 52/146
(Continued)

OTHER PUBLICATIONS

Ericsson: "Support of Power Control Mechanism for SRS Transmission in Cells without Configured PUSCH Transmission", 3GPP TSG-RAN WG1 Meeting #86, 3GPP Draft, R1-167485—Support of Power Control Mechanism for SRS Transmission in Cells without Configured PUSCH Transmission, 3rd Generation Partnership Project (3GPP), Mobile Competence Centre, 650, Route Des Lucioles, F-06921 Sophia-Antipolis Cedex, France, vol. RAN WG1, No. Goteborg, Aug. 22, 2016-Aug. 26, 2016, Aug. 12, 2016 (Aug. 12, 2016), pp. 1-3, XP051144635, Retrieved from the Internet: URL: http://www.3gpp.org/ftp/tsg_ran/WG1_RL1/TSGR1_86/Docs/ [retrieved on Aug. 12, 2016], Section 2.2.
(Continued)

*Primary Examiner* — Harry H Kim
(74) *Attorney, Agent, or Firm* — Guang Y. Zhang; Loza & Loza LLP

(57) ABSTRACT

Aspects relate to wireless communication having sounding reference signal (SRS) power control using non-scheduling downlink control information (DCI) that is configured to trigger aperiodic SRS without scheduling data and without a channel state information (CSI) request. The non-scheduling is configured to include at least two transmit power control (TPC) commands. A first TPC command is configured for power control of a physical uplink shared channel (PUSCH) transmitted by a UE to a base station. A second TPC command is configured for power control of one or more sounding reference signal (SRS) resource sets. Additionally, the first TPC command may be independent from the second TPC command where different power control is implemented for the PUSCH and the SRS transmissions. Additionally, the non-scheduling DCI may be formatted according to a DCI format 0_1 or a DCI format 0_2.

29 Claims, 15 Drawing Sheets

(51) Int. Cl.
*H04W 52/08* (2009.01)
*H04W 52/32* (2009.01)
*H04W 52/36* (2009.01)
*H04W 72/1263* (2023.01)

(58) Field of Classification Search
CPC .. H04W 52/325; H04L 5/0051; H04L 5/0053; H04L 5/0094
See application file for complete search history.

(56) References Cited

U.S. PATENT DOCUMENTS

| | | | | |
|---|---|---|---|---|
| 2023/0371112 | A1* | 11/2023 | Jeon | H04W 52/28 |
| 2024/0031103 | A1* | 1/2024 | Liu | H04L 5/0048 |
| 2024/0031941 | A1* | 1/2024 | Sun | H04W 52/322 |
| 2024/0057112 | A1* | 2/2024 | Deghel | H04L 5/0035 |
| 2024/0080774 | A1* | 3/2024 | Wang | H04L 1/1854 |
| 2024/0098742 | A1* | 3/2024 | Deghel | H04W 72/20 |
| 2024/0188001 | A1* | 6/2024 | Su | H04W 52/38 |

OTHER PUBLICATIONS

International Search Report and Written Opinion—PCT/US2022/023556—ISA/EPO—Jul. 12, 2022.
Qualcomm Incorporated: "Discussion on SRS Enhancement", 3GPP TSG-RAN WG1 Meeting #103-e, 3GPP Draft, R1-2009255, 3rd Generation Partnership Project (3GPP) I Mobile Competence Centre, 650, Route Des Lucioles, F-06921 Sophia-Antipolis Cedex, France, vol. RAN WG1, No. e-Meeting, Oct. 26, 2020-Nov. 13, 2020, Oct. 24, 2020 (Oct. 24, 2020), XP051946918, 32 Pages, Retrieved from the Internet: URL: https://ftp.3gpp.org/tsg_ran/WG1_RL1/TSGR1_103-e/Docs/R1-2009255.zip, R1-2009255 Enhancements on SRS flexibility, coverage and capacity.docx, [retrieved on Oct. 24, 2020], Nov. 1, 2020 (Nov. 1, 2020), section 2, section 2.1.2, 2.1.3, Sections 1-5, paragraph [04.1]-paragraph [4.1.1], paragraph [02.1]-paragraph [02.2], section 2.1.2.3, 2.2.1.

* cited by examiner

| Field name | DCI 0_1 | DCI 0_2 |
|---|---|---|
| DCI format identifier | 1 | 1 |
| CIF | 0,3 | 0-3 |
| DFI flag | 0,1 | n/a |
| UL/SUL indicator | 0,1 | 0,2 |
| BWP indicator | 0-2 | 0-2 |
| Frequency-domain RA | 0-18 | 0-18 |
| Time domain RA | 0-6 | 0-6 |
| FH flag | 0,1 | 0,1 |
| MCS for TB1 | 5 | 5 |
| NDI for TB1 | 1-3 | 1 |
| RV for TB1 | 2-8 | 0-2 |
| HARQ process number | 4 | 0-4 |
| 1st DAI | 1,2,4 | 0,1,2,4 |
| 2nd DAI | 0,2,4 | n/a |
| TPC command for PUSCH | 2 | 2 |
| SRS resource indicator | 1-4 | 0-4 |
| Precoding info and no. layers | 0-6 | 0-6 |
| Antenna port(s) | 2-5 | 0, 2-5 |
| SRS request | 2,3 | 0-3 |
| CSI request | 0-6 | 0-6 |
| CBGTI | 0,2,4,6,8 | n/a |
| PTRS-DMRS association | 0,2 | 0,2 |
| Beta-offset indicator | 0,2 | 0-2 |
| DMRS seqinit | 0,1 | 0,1 |
| UL-SCH indicator | 0,1 | 0,1 |
| ChannelAccess CPext-CAP | 0-6 | n/a |
| OLPC set indicator | 0-2 | 0-2 |
| Priority indicator | 0,1 | 0,1 |
| Invalid symbol pattern | 0,1 | 0,1 |
| Min scheduling offset | 0,1 | n/a |
| Scell Dormancy indication | 0-5 | n/a |
| Sidelink assignment index | 0,1,2 | n/a |

FIG. 4

FIG. 14

SOUNDING REFERENCE SIGNAL POWER CONTROL WITH NON-SCHEDULING DOWNLINK CONTROL INFORMATION

CROSS REFERENCE TO RELATED APPLICATIONS

This application claims priority to and the benefit of U.S. Provisional Application No. 63/171,501 filed in the U.S. Patent and Trademark Office on Apr. 6, 2021, the entire contents of which are incorporated herein by reference as if fully set forth below in its entirety and for all applicable purposes.

TECHNICAL FIELD

The technology discussed below relates generally to wireless communication and, more particularly, to sounding reference signal (SRS) power control using non-scheduling downlink control information (DCI) configured to trigger aperiodic SRS without scheduling data and without a channel state information (CSI) request.

INTRODUCTION

Next-generation wireless communication systems (e.g., 5GS) may include a 5G core network and a 5G radio access network (RAN), such as a New Radio (NR)-RAN. The NR-RAN supports communication via one or more cells. For example, a wireless communication device such as a user equipment (UE) may access a cell via a network entity or node, which may be implemented by a base station or gNodeB (gNB), for example.

In 5G RANs, a sounding reference signal (SRS) is a reference signal that is transmitted by a UE in the uplink (UL) direction to a gNB or base station (or other network node). The SRS may provide information about the combined effect of multipath fading, scattering, Doppler and power loss of transmitted signal, for example. This information, in turn, may be used by the base station or gNB to estimate the channel quality of the UL channel over a wide range of frequencies (e.g., the full bandwidth) and allocate transmission resources to bandwidth regions (e.g., bandwidth parts) having better channel quality, or for positioning. One particular type of SRS is aperiodic SRS (A-SRS), which is a "trigger type" of SRS transmission that may be configured by radio resource control (RRC) layers and is triggered by downlink control information (DCI) transmitted on the downlink (DL) from the gNB to the UE.

BRIEF SUMMARY OF SOME EXAMPLES

The following presents a summary of one or more aspects of the present disclosure, in order to provide a basic understanding of such aspects. This summary is not an extensive overview of all contemplated features of the disclosure and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

According to an aspect, a method for communication at a base station is disclosed. The method includes configuring downlink control information (DCI) to include a plurality of transmit power control (TPC) commands including: a first TPC command of the plurality of TPC commands configured for power control of a physical uplink shared channel (PUSCH); and a second TPC command of the plurality of TPC commands configured for power control of one or more sounding reference signal (SRS) resource sets; and preparing the DCI for transmission to at least one user equipment (UE).

In another aspect, a network entity such as a base station is disclosed including a processor configured to configure downlink control information (DCI) to include a plurality of transmit power control (TPC) commands including: a first TPC command of the plurality of TPC commands configured for power control of a physical uplink shared channel (PUSCH), and a second TPC command of the plurality of TPC commands configured for power control of one or more sounding reference signal (SRS) resource sets. The processor is also configured to prepare the DCI for transmission to at least one user equipment (UE).

According to yet another aspect, a method for communication at a user equipment (UE) is disclosed. The method includes processing downlink control information (DCI) received from a network entity, the DCI comprising a plurality of transmit power control (TPC) commands including a first TPC command of the plurality of TPC commands configured for power control of a physical uplink shared channel (PUSCH), and a second TPC command of the plurality of TPC commands configured for power control of one or more sounding reference signal (SRS) resource sets. The method also includes configuring resources for at least one of PUSCH and SRS transmissions based on the first or second TPC commands.

In yet another aspect, a user equipment is disclosed including a transceiver, a memory, and a processor communicatively coupled to the transceiver and the memory. The processor is configured to receive downlink control information (DCI) configured to include a plurality of transmit power control (TPC) commands including a first TPC command of the plurality of TPC commands configured for power control of a physical uplink shared channel (PUSCH), and a second TPC command of the plurality of TPC commands configured for power control of one or more sounding reference signal (SRS) resource sets. The processor also configures resources for at least one of PUSCH and SRS transmissions based on the first or second TPC commands, and transmits the configured resources for at least one of the PUSCH and SRS transmissions.

These and other aspects of the disclosure will become more fully understood upon a review of the detailed description, which follows. Other aspects, features, and embodiments of the present disclosure will become apparent to those of ordinary skill in the art, upon reviewing the following description of specific, example embodiments of the present disclosure in conjunction with the accompanying figures. While features of the present disclosure may be discussed relative to certain embodiments and figures below, all embodiments of the present disclosure can include one or more of the advantageous features discussed herein. In other words, while one or more embodiments may be discussed as having certain advantageous features, one or more of such features may also be used in accordance with the various embodiments of the disclosure discussed herein. In similar fashion, while example embodiments may be discussed below as device, system, or method embodiments it should be understood that such example embodiments can be implemented in various devices, systems, and methods.

BRIEF DESCRIPTION OF THE DRAWINGS

FIG. 4 illustrates an example of DCI bitfields according to some aspects.

FIG. 14 is a flow chart illustrating an example of a method for communication in a UE according to some aspects.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form to avoid obscuring such concepts.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, artificial intelligence-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or original equipment manufacturer (OEM) devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, radio frequency (RF) chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

Figure 1:
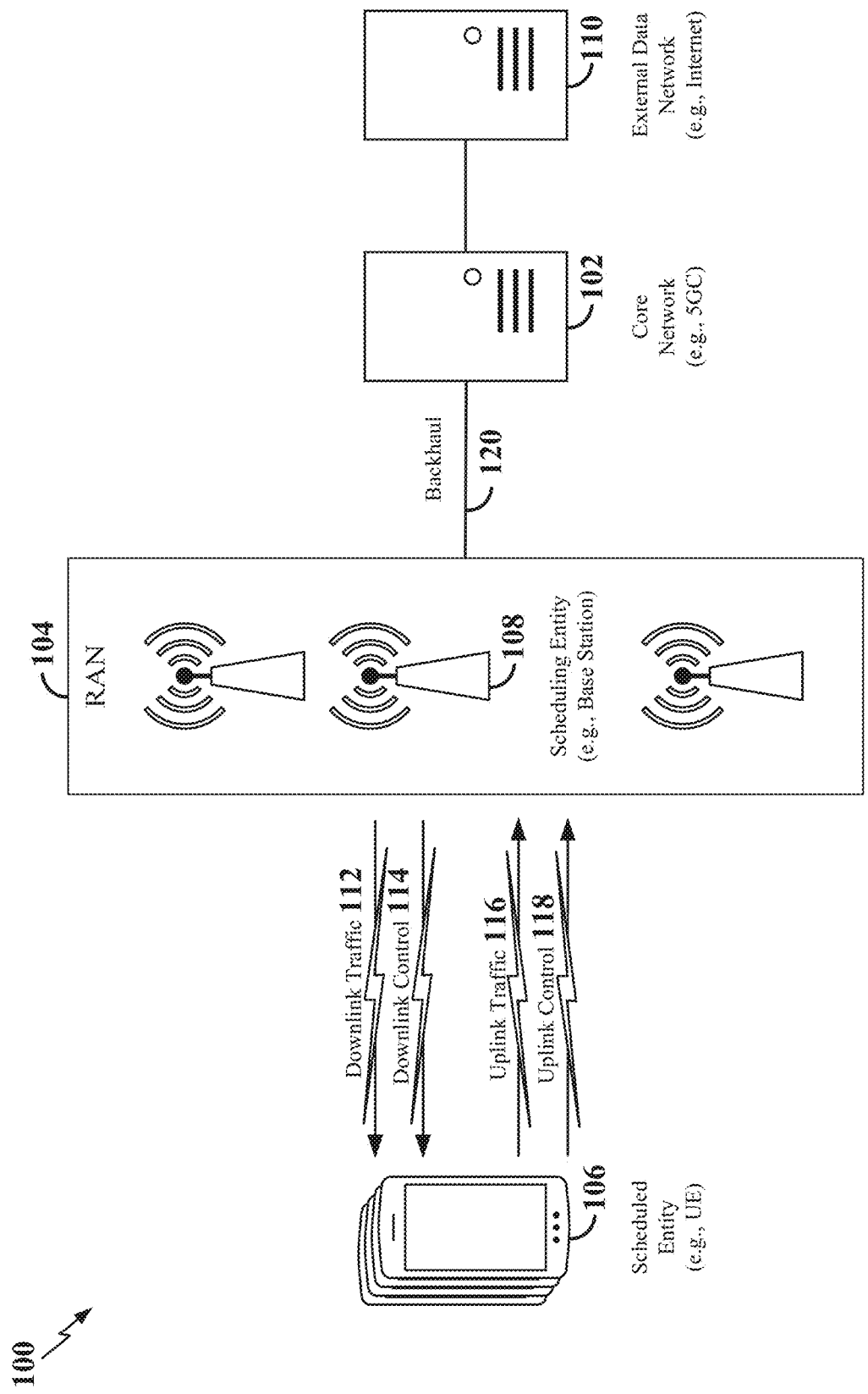
FIG. 1 is a schematic illustration of a wireless communication system according to some aspects.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and at least one scheduled entity 106. The at least one scheduled entity 106 may be referred to as a user equipment (UE) 106 in the discussion that follows. The RAN 104 includes at least one scheduling entity 108. The at least one scheduling entity 108 may be referred to as a base station (BS) 108 in the discussion that follows. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to $3^{rd}$ Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as LTE. The 3GPP refers to this hybrid RAN as a next-generation RAN, or NG-RAN. Of course, many other examples may be utilized within the scope of the present disclosure.

As illustrated, the RAN 104 includes a plurality of base stations 108. Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be co-located or non-co-located. The TRPs may communicate on the same carrier frequency or different carrier frequencies within the same frequency band or different frequency bands.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move, and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer, a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multicopter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, etc.; an industrial automation and enterprise device; a logistics controller; agricultural equipment; military defense equipment, vehicles, aircraft, ships, and weaponry, etc. Still further, a mobile apparatus may provide for connected medicine or telemedicine support, i.e., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In some examples, the term downlink may refer to a point-to-multipoint transmission originating at a scheduling entity (described further below, e.g., base station 108). Another way to describe this point-to-multipoint transmission scheme may be to use the term broadcast channel multiplexing. Transmissions from a UE (e.g., UE 106) to a base station (e.g., base station 108) may be referred to as uplink (UL) transmissions. In some examples, the term uplink may refer to a point-to-point transmission originating at a scheduled entity (described further below, e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

Base stations 108 are not the only entities that may function as scheduling entities. That is, in some examples, a UE may function as a scheduling entity, scheduling resources for one or more scheduled entities (e.g., one or more other UEs).

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 and/or uplink control information 118 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols in some examples. A subframe may refer to a duration of 1 millisecond (ms). Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
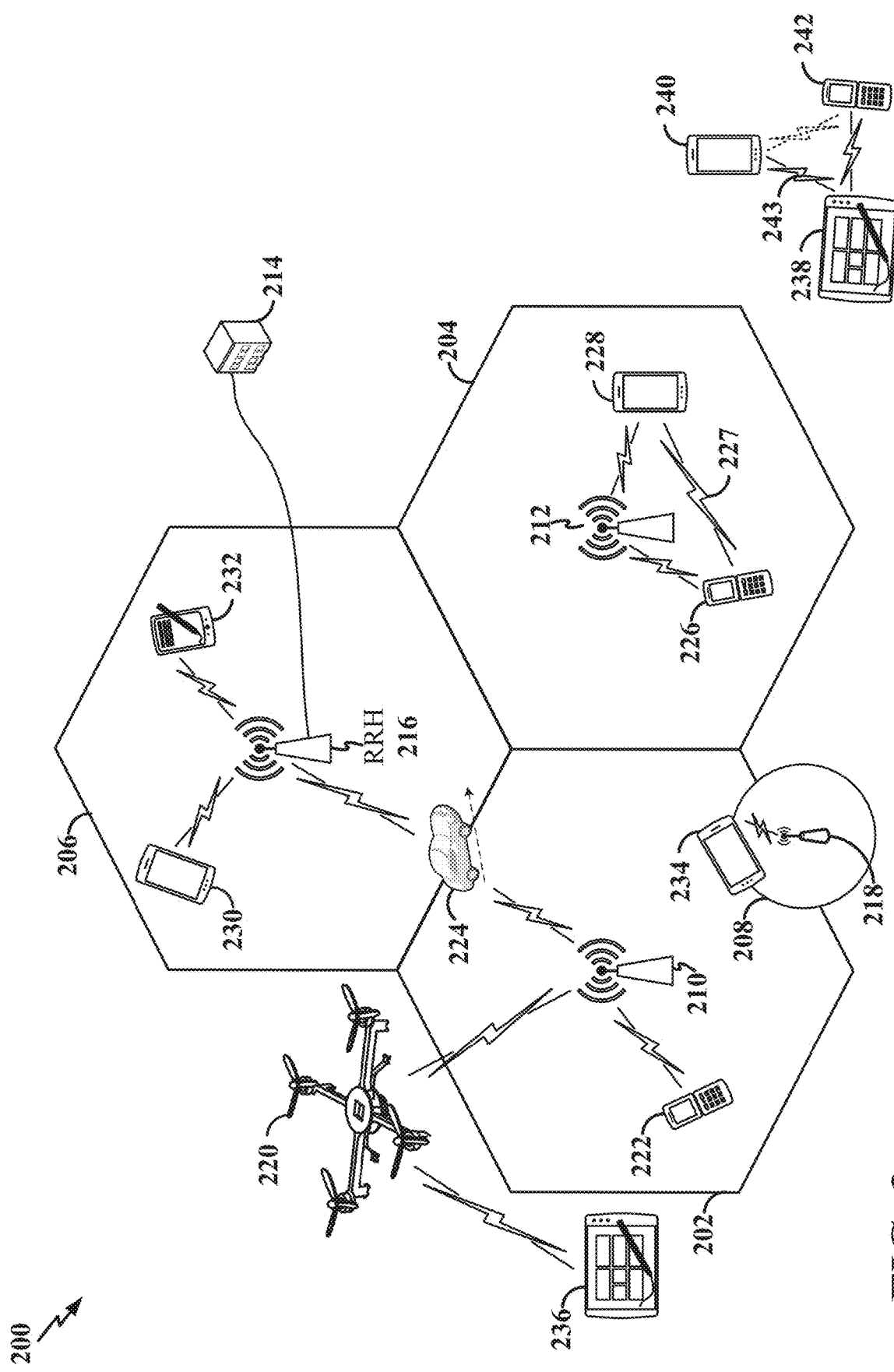
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204, and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIG. 1) for all the UEs in the respective cells. For example, UEs 222 and 224 may be in communication with base station 210, UEs 226 and 228 may be in communication with base station 212, UEs 230 and 232 may be in communication with base station 214 by way of RRH 216, and UE 234 may be in communication with base station 218. In some examples, the UEs 222, 224, 226, 228, 230, 232, 234, 236, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210. In some examples, a UAV 220 may be configured to function as a BS (e.g., serving a UE 236). That is, in some examples, a cell may not necessarily be stationary, and the geographic area of the cell may move according to the location of a mobile base station such as a UAV 220.

In the radio access network 200, the ability for a UE to communicate while moving, independent of its location, is referred to as mobility. The various physical channels between the UE and the radio access network are generally set up, maintained, and released under the control of an access and mobility management function (AMF). The AMF (not shown in FIG. 2) may include a security context management function (SCMF) that manages the security context for both the control plane and the user plane functionality, and a security anchor function (SEAF) that performs authentication.

A radio access network 200 may utilize DL-based mobility or UL-based mobility to enable mobility and handovers (i.e., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of the serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs), and unified Physical Broadcast Channels (PBCHs)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without the need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). The frequencies between FR1 and FR2 are often referred to as mid-band frequencies. Although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, or may be within the EHF band.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexed (OFDM) waveforms with a cyclic prefix (CP). In addition, for UL transmissions, 5G NR specifications provide support for discrete Fourier transform-spread-OFDM (DFT-s-OFDM) with a CP (also referred to as single-carrier frequency division multiple access (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexed (OFDM) transmission, sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancelation technologies. Full-duplex emulation is frequently implemented for wireless links by utilizing frequency division duplex (FDD) or spatial division duplex (SDD). In FDD, transmissions in different directions operate at different carrier frequencies. In SDD, transmissions in different directions on a given channel are separate from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to as sub-band full-duplex (SBFD), also known as flexible duplex.

In a further aspect of the RAN 200, sidelink signals may be used between UEs without necessarily relying on scheduling or control information from a base station. For example, two or more UEs (e.g., UEs 226 and 228) may communicate with each other using peer to peer (P2P) or sidelink signals 227 without relaying that communication through a base station (e.g., base station 212). In a further example, UE 238 is illustrated communicating with UEs 240 and 242. Here, the UE 238 may function as a scheduling entity or a primary sidelink device, and UEs 240 and 242 may function as a scheduled entity or a non-primary (e.g., secondary) sidelink device. In still another example, a UE may function as a scheduling entity in a device-to-device (D2D), peer-to-peer (P2P), or vehicle-to-vehicle (V2V) network, and/or in a mesh network. In a mesh network example, UEs 240 and 242 may optionally communicate directly with one another via sidelink signals such as 243 in addition to communicating with the UE 238 (e.g., functioning as a scheduling entity). Thus, in a wireless communication system with scheduled access to time-frequency resources and having a cellular configuration, a P2P configuration, or a mesh configuration, a scheduling entity and one or more scheduled entities may communicate utilizing the scheduled resources. In some examples, the sidelink signals 227 include sidelink traffic (e.g., a physical sidelink shared channel) and sidelink control (e.g., a physical sidelink control channel).

In some examples, two or more UEs (e.g., UEs 226 and 228) within the coverage area of a serving base station 212 may communicate with both the base station 212 using cellular signals and with each other using direct link signals (e.g., sidelink signals 227) without relaying that communication through the base station. In an example of a V2X network within the coverage area of the base station 212, the base station 212 and/or one or both of the UEs 226 and 228 may function as scheduling entities to schedule sidelink communication between UEs 226 and 228.

Figure 3:
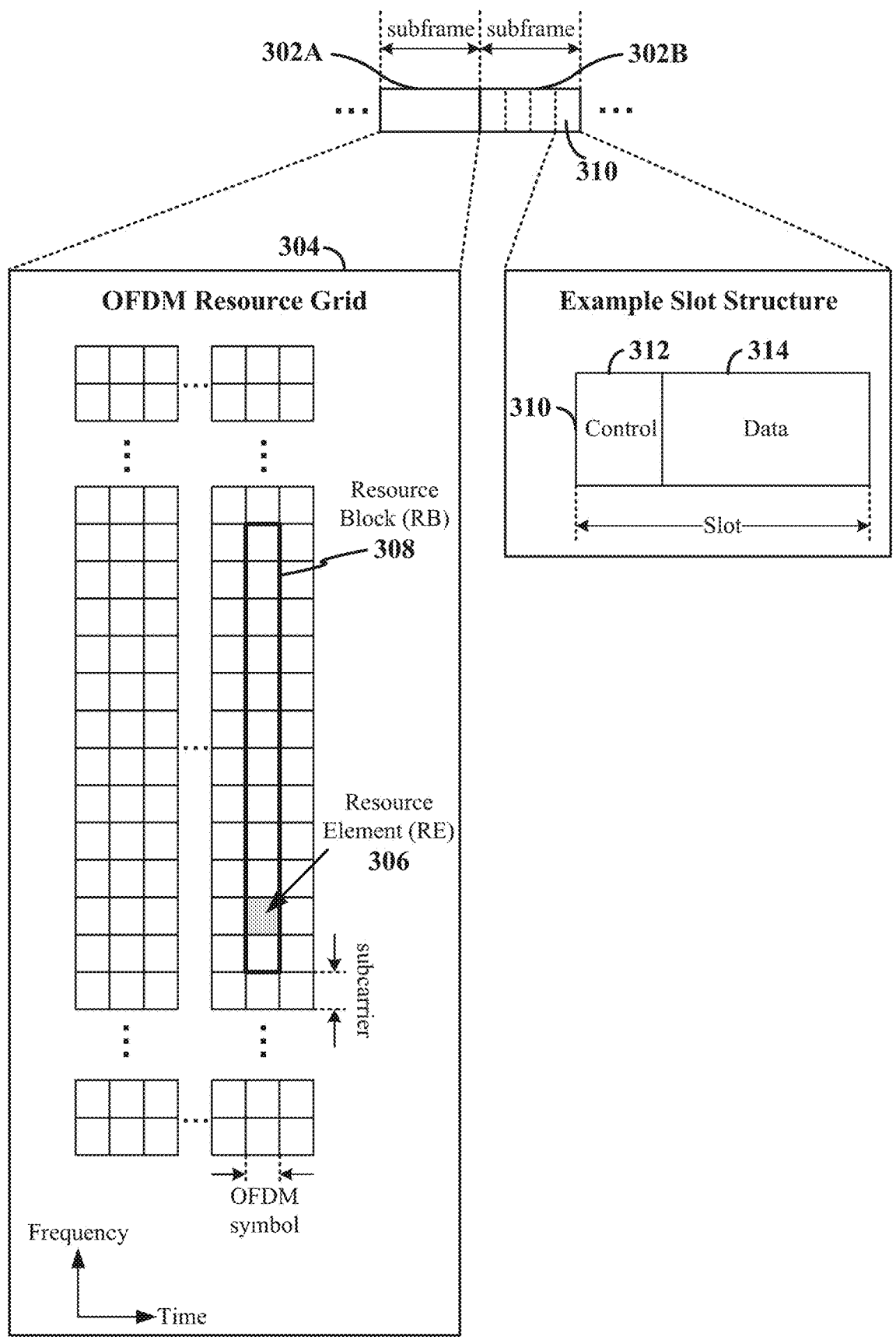
FIG. 3 is a schematic illustration of an example of wireless resources in an air interface utilizing orthogonal frequency divisional multiplexed (OFDM) signals according to some aspects.

Various aspects of the present disclosure will be described with reference to an OFDM waveform, an example of which is schematically illustrated in FIG. 3. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Referring now to FIG. 3, an expanded view of an example DL subframe 302A or 302B is illustrated, showing an OFDM resource grid 304. However, as those skilled in the art will readily appreciate, the physical layer (PHY) transmission structure for any particular application may vary from the example described here, depending on any number of factors. Here, time is in the horizontal direction with units of OFDM symbols, and frequency is in the vertical direction with units of subcarriers. 5G NR supports a scalable numerology where different numerologies may be used for different radio frequency spectrums, different bandwidths, and the like. For example, sub-carrier spacings (SCSs) of 15 kHz, 30 kHz, 60 kHz, etc., may be used in different scenarios.

The resource grid 304 may be used to schematically represent time-frequency resources for a given antenna port. That is, in a multiple-input-multiple-output (MIMO) implementation with multiple antenna ports available, a corresponding multiple number of resource grids 304 may be available for communication. The resource grid 304 is divided into multiple resource elements (REs) 306. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or more simply a resource block (RB) 308, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 308 entirely corresponds to a single direction of communication (either transmission or reception for a given device).

Scheduling of UEs (e.g., scheduled entities) for downlink, uplink, or sidelink transmissions typically involves scheduling one or more resource elements 306 within one or more sub-bands or bandwidth parts (BWPs). Each bandwidth part (BWP) may include two or more contiguous or consecutive RBs. Thus, a UE generally utilizes only a subset of the resource grid 304. In some examples, an RB may be the smallest unit of resources that can be allocated to a UE. Thus, the more RBs scheduled for a UE, and the higher the modulation scheme chosen for the air interface, the higher the data rate for the UE. The RBs may be scheduled by a base station (e.g., gNB, eNB, RSU, etc.) or may be self-scheduled by a UE implementing D2D sidelink communication.

In this illustration, the RB 308 is shown as occupying less than the entire bandwidth of the subframe 302A, with some subcarriers illustrated above and below the RB 308. In a given implementation, the subframe 302A may have a bandwidth corresponding to any number of one or more RBs 308. Further, in this illustration, the RB 308 is shown as occupying less than the entire duration of the subframe 302A, although this is merely one possible example.

Each 1 ms subframe 302A may consist of one or multiple adjacent slots. In the example shown in FIG. 3, one subframe 302B includes four slots 310, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots having a shorter duration (e.g., one or two OFDM symbols). These mini-slots may in some cases be transmitted occupying resources scheduled for ongoing slot transmissions for the same or for different UEs. Any number of resource blocks may be utilized within a subframe or slot.

An expanded view of one of the slots 310 illustrates the slot 310 including a control region 312 and a data region 314. In general, the control region 312 may carry control channels (e.g., physical downlink control channels (PDCCHs)), and the data region 314 may carry data channels (e.g., physical downlink shared channel (PDSCH) or physical uplink shared channel (PUSCH)). Of course, a slot may contain all DL, all UL, or at least one DL portion and at least one UL portion. The structure illustrated in FIG. 3 is merely an example, and different slot structures may be utilized, and may include one or more of each of the control region(s) and data region(s).

Although not illustrated in FIG. 3, the various REs 306 within an RB 308 may be scheduled to carry one or more physical channels, including control channels, shared channels, data channels, etc. Other REs 306 within the RB 308 may also carry pilots or reference signals, including but not limited to a demodulation reference signal (DMRS), a control reference signal (CRS), or a sounding reference signal (SRS). These pilots or reference signals may provide for a receiving device to perform channel estimation of the corresponding channel, which may enable coherent demodulation/detection of the control and/or data channels within the RB 308.

In some examples, a slot 310 may be utilized for broadcast or unicast communication. In V2X or D2D networks, a broadcast communication may refer to a point-to-multipoint transmission by a one device (e.g., a vehicle, base station (e.g., RSU, gNB, eNB, etc.), UE, or other similar device) to other devices. A unicast communication may refer to a point-to-point transmission by a one device to a single other device.

In an example, the control region 312 of the slot 310 may include a physical downlink control channel (PDCCH) including downlink control information (DCI) transmitted by a base station (e.g., gNB, eNB, RSU, etc.) towards one or more of a set of UEs, which may include one or more sidelink devices (e.g., V2X/D2D devices). In some examples, the DCI may include synchronization information to synchronize communication by a plurality of sidelink devices on the sidelink channel. In addition, the DCI may include scheduling information indicating one or more resource blocks within the control region 312 and/or data region 314 allocated to sidelink devices for sidelink communication. For example, the control region 312 of the slot may further include control information transmitted by sidelink devices over the sidelink channel, while the data region 314 of the slot 310 may include data transmitted by sidelink devices over the sidelink channel. In some examples, the control information may be transmitted within a physical sidelink control channel (PSCCH), while the data may be transmitted within a physical sidelink shared channel (PSSCH).

In a DL transmission (e.g., over the Uu interface), the transmitting device (e.g., the scheduling entity) may allocate one or more REs 306 (e.g., within a control region 312) to carry DL control information including one or more DL control channels, such as a PBCH, and/or a physical downlink control channel (PDCCH), etc., to one or more scheduled entities. The transmitting device may further allocate one or more REs 306 to carry other DL signals, such as a DMRS, a phase-tracking reference signal (PT-RS), a channel state information—reference signal (CSI-RS), a primary synchronization signal (PSS), and a secondary synchronization signal (SSS).

The synchronization signals PSS and SSS, and in some examples, the PBCH and a PBCH DMRS, may be transmitted in a synchronization signal block (SSB) that includes 3 consecutive OFDM symbols, numbered via a time index in increasing order from 0 to 3. In the frequency domain, the SSB may extend over 240 contiguous subcarriers, with the subcarriers being numbered via a frequency index in increasing order from 0 to 239. Of course, the present disclosure is not limited to this specific SSB configuration. Other nonlimiting examples may utilize greater or fewer than two synchronization signals, may include one or more supplemental channels in addition to the PBCH, may omit a PBCH, and/or may utilize a different number of symbols and/or nonconsecutive symbols for an SSB, within the scope of the present disclosure.

The SSB may be used to send system information (SI) and/or provide a reference to SI transmitted via another channel. Examples of system information may include, but are not limited to, subcarrier spacing, system frame number, a cell global identifier (CGI), a cell bar indication, a list of common control resource sets (coresets), a list of common search spaces, a search space for system information block 1 (SIB1), a paging search space, a random-access search space, and uplink configuration information. Two specific examples of coresets include PDCCH CORESET 0 and CORESET 1.

The PDCCH may carry downlink control information (DCI) including but not limited to power control commands, scheduling information, a grant, and/or an assignment of REs for DL and UL transmissions. The physical layer (PHY) carries hybrid automatic repeat request (HARQ) feedback transmissions such as an acknowledgment (ACK) or a negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

In an UL transmission (e.g., over the Uu interface), the transmitting device (e.g., the scheduled entity) may utilize one or more REs 306 to carry UL control information including one or more UL control channels, such as a physical uplink control channel (PUCCH), to the scheduling entity. UL control information may include a variety of packet types and categories, including pilots, reference signals, and information configured to enable or assist in decoding uplink data transmissions. For example, the UL control information may include a DMRS or SRS. In some examples, the control information may include a scheduling request (SR), i.e., a request for the scheduling entity to schedule uplink transmissions. Here, in response to the SR transmitted on the control channel, the scheduling entity may transmit downlink control information that may schedule resources for uplink packet transmissions. UL control information may also include HARQ feedback, channel state feedback (CSF), or any other suitable UL control information.

In addition to control information, one or more REs 306 (e.g., within the data region 314) may be allocated for user data or traffic data. Such traffic may be carried on one or more traffic channels, such as, for a DL transmission, a PDSCH, or for an UL transmission or a physical uplink shared channel (PUSCH). In some examples, one or more REs 306 within the data region 314 may be configured to carry SIBs (e.g., SIB1), carrying system information that may enable access to a given cell.

The physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described above with reference to FIGS. 1-3 are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

5G-NR networks may further support carrier aggregation (CA) of component carriers transmitted from different cells and/or different transmission and reception points (TRPs) in a multi-cell transmission environment. The different TRPs may be associated with a single serving cell or multiple serving cells. In some aspects, the term component carrier may refer to a carrier frequency (or band) utilized for communication within a cell.

Additionally, 5G-NR utilize sounding reference signals (SRS), which are transmitted from a UE to the network on the UL, such as from a UE to a base station or gNB, for example. Further, triggered SRS or aperiodic SRS (A-SRS) may be used where the transmission of the A-SRS resources is triggered by downlink control information (DCI) transmitted on the DL from a network node such as a base station or gNB, for example.

In some scenarios, 3GPP 5G NR specifications may provide for an SRS enhancement where an enhanced or non-scheduling DCI (e.g., DCI formats 0_1 and 0_2) triggers A-SRS without scheduling data or a CSI-request. It is noted here that the term "non-scheduling DCI" as used herein may be defined as DCI that is not used for scheduling transmission resources either on the UL or the DL, but rather is used for other purposes such as flexible triggering of A-SRS, as well as for power control as will be described herein.—In other aspects, the term "non-scheduling DCI" may further encompass DCI configured to solely trigger aperiodic SRS without scheduling data and without a CSI request.

When using a non-scheduling DCI for the purpose of triggering of A-SRS without PUSCH and without CSI-request, it is noted that bitfields within the DCI (e.g., DCI format 0_1 or 0_2) may be repurposed for the enhancement of A-SRS Triggering, and more particularly for functions such as transmit power control (TPC) in a UE for transmission of the SRS. For example, a TPC bitfield for the PUSCH may be repurposed for SRS power control. Additionally, two power controls may be used for SRS transmission, which are either configured with separate or the same as the PUSCH power control.

Of further note, SRS power control for setting the power of the SRS transmissions (i.e., $P_{SRS}$), may be determined based on the following conditions:

$$P_{SRS,b,f,c}(i, q_s, l) = \min \left\{ \begin{array}{l} P_{CMAX,f,c}(i), \\ P_{0\_SRS,b,f,c}(q_s) + 10\log_{10}(2^\mu \cdot M_{SRS,b,f,c}(i)) + \\ \alpha_{SRS,b,f,c}(q_s) \cdot PL_{b,f,c}(q_d) + h_{b,f,c}(i, l) \end{array} \right\} [dBm]$$

where the power may be configured per each SRS resource set. The SRS power control adjustment state is made for an active UL BWP b, of a carrier f of a serving cell c, and an SRS transmission occasion i. Additionally, there may be same or separate adjustments states for the PUSCH and SRS transmission and, in the case of same adjustment states for PUSCH and SRS, at least two further first and second adjustment states indicated by l being equal to 0 or 1, respectively. Moreover, in the case of same SRS and PUSCH power control adjustment states, the value of $h_{b,f,c}(i,l)$ is equal to $f_{b,f,c}(i,l)$, where $f_{b,f,c}(i,l)$ is the current PUSCH power control adjustment state. In the case of separate adjustment states between the PUSCH and SRS transmissions, only one closed loop index (i.e., one adjustment state) is defined for SRS (i.e., no 1 value in function h(.)). Thus, $h_{b,f,c}(i)=h_{b,f,c}(i-i_0)+\Sigma_{m=0}^{C(S_i)-1}\delta_{SRS,b,f,c}(m)$, where the value $\delta_{SRSb,f,c}(m)$ is jointly coded with other TPC commands in a PDCCH with DCI format 2_3 (which is used for transmission of a group of TPC commands for SRS transmissions by one or more UEs), for example.

As mentioned above, bitfields within non-scheduling DCI may be reused or repurposed bitfields of normal DCI. In particular, these fields may be repurposed for indicating power control, such as SRS power control. As an example showing DCI format 0_1 and DCI format 0_2 bitfields, the table 400 in FIG. 4 illustrates the various fields used within each these DCI formats. As merely an example, the non-zero fields highlighted in gray in FIG. 4, such as non-zero DCI bit fields related to scheduling including modulation and coding scheme (MCS), new data indicator (NDI), redundancy version (RV), HARQ process number, downlink assignment index (DAI), TPC command for scheduled PUSCH, SRS resource indicator (SRI), and Antenna ports may be candidates for repurposing. As may be seen, DCI 0_1 has more candidate bitfields (18 bits) than DCI format 0_2 (8 bits).

Figure 5:
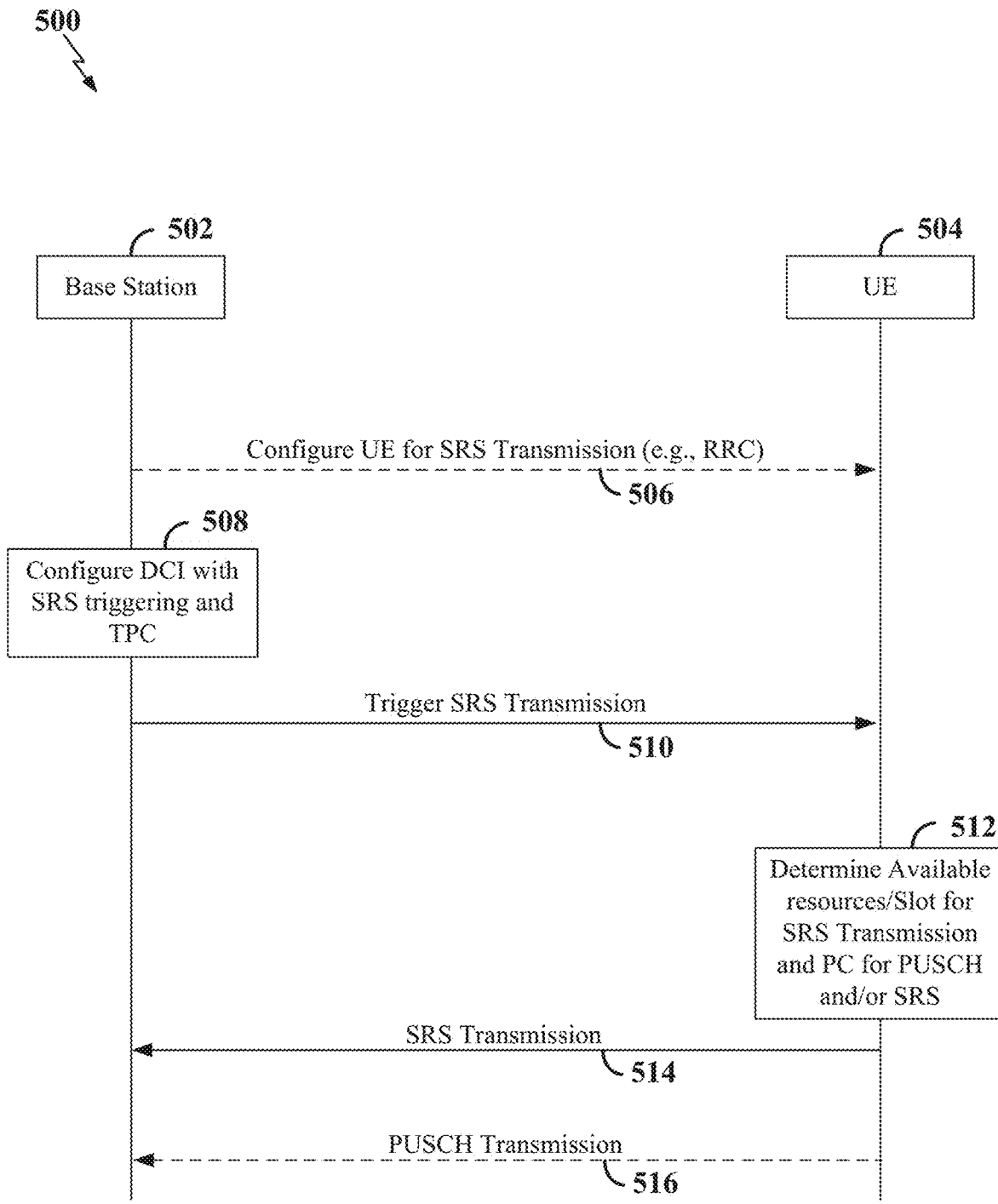
FIG. 5 is a call flow diagram illustrating an example of signaling for triggering and transmit power control (TPC) of a sounding reference signal (SRS) transmission according to some aspects.

FIG. 5 illustrates a call flow diagram 500 illustrating an example of scheduling an SRS transmission in a wireless communication system including a base station (BS) 502 and a UE 504. In some examples, the BS 502 may correspond to any of the base stations or scheduling entities shown in any of FIGS. 1, 2 and 11. In some examples, the UE 504 may correspond to any of the UEs or scheduled entities shown in any of FIGS. 1, 2, and 13.

At step 506, the BS 502 may configure the UE for receipt of an SRS trigger with a non-scheduling DCI, as well as for the SRS transmission, including TPC. For example, the BS 502 may send an RRC message to the UE 504, where the RRC message specifies the resources and other information to be used by the UE 504 for the SRS transmission. It is noted that step 506 may be optional, and that the UE may be preconfigured is some aspects.

At step 508 of FIG. 5, the BS 502 configures a DCI (e.g., a non-scheduling DCI) for an SRS trigger transmission, and may further include TPC information. For example, the BS 502 may configure the non-scheduling DCI to include TPC for both PUSCH and SRS transmissions, which may further be the same or different as will be discussed in more detail below.

At step 510, the BS 502 triggers the SRS transmission by transmitting the configured DCI to the UE 504. In one example, the BS 502 may send the DCI configured in step 508 to the UE 504 via a PDCCH.

At step 512, the UE 504 determines whether there is an available slot for the SRS transmission. Moreover, the UE may determine PUSCH and SRS transmission power command (i.e., TPC) based on information within the received non-scheduling DCI according to some examples. Further, as will be discussed later, the DCI may also include control or power adjustment state indications (e.g., 1 value as discussed above) and the power control is based, at least in part, on these state indications.

At step 514, the UE 504 transmits the SRS transmission on the scheduled SRS resource set. Additionally, if PUSCH transmission is allocated, the PUSCH transmission is also effected as shown at step 516.

In some aspects, the configured non-scheduling or "dummy" DCI as determined in step 508 may trigger two or more A-SRS resource sets that may have different power control configurations where one set is configured to follow PUSCH while the other set is configured with a separate power control. In present 3GPP specification, the only previously known method for closed loop power control (PC) for SRS if using a separate PC was by a group common (GC) DCI format 2_3 that is used for transmission of a group of TPC commands for SRS transmissions by one or more UEs.

Accordingly, a configuration for a non-scheduling DCI may include the indication of two (or more) TPC commands within the payload of the DCI. In one example, one first TPC command of the two or more TPC commands may be for PUSCH ($\delta_{PUSCH}$) power control. This command may be applied to both the triggered A-SRS that has same power control as PUSCH, as well as to all future granted PUSCHs. At least one other second TPC command in the non-scheduling DCI is for SRS ($\delta_{SRS}$) power control. This may be applied to the triggered A-SRS resource set(s) with separate power control from the PUSCH power control. The second TPC bitfield may be introduced by repurposing some of the unused bitfields. In further aspects, the base station may introduce a new RRC-parameter that indicates whether or not the non-scheduling DCI contains the extra second TPC command for SRS with separate power control. As an example, this RRC signaling/configuration may correspond to step 508 in FIG. 5.

As will be described below, one aspect relates to whether or not a non-scheduling or dummy DCI includes a TPC command or not. In an aspect, higher layer parameters and/or other RRC signaling/configuration may enable a UE to determine whether a non-scheduling DCI includes TPC commands for A-SRS resource sets. Furthermore, if a UE determines that the DCI includes TPC, the DCI might include either a single TPC command or multiple TPC commands. In the case of two TPC commands, as an example, one may be for PUSCH power control and the other for SRS power control. If there is a single TPC command in the non-scheduling DCI, the UE may be configured to know if the TPC command is PUSCH or SRS power control.

Figure 6:
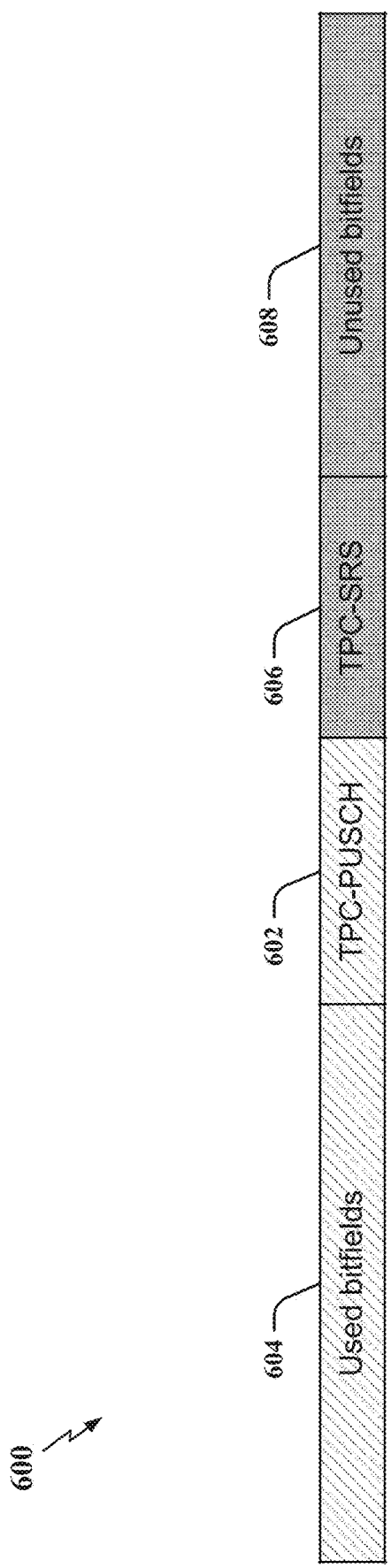
FIG. 6 illustrates an example of a non-scheduling DCI triggering A-SRS transmission including both PUSCH and SRS transmit power control (TPC) according to some aspects.

As an example of the non-scheduled DCI format, FIG. 6 illustrates one example of a DCI 600 configured with TPC commands or information for both PUSCH and SRS. As shown, the DCI 600 may be configured to include a first TPC command or command field 602 for PUSCH. Additionally, other used bitfields 604 are shown in the DCI 600. Furthermore, DCI 600 includes a second TPC command, command field, or information 606, which may be placed in bitfields that were unused or are repurposed for this non-scheduling DCI 600. Additionally, the DCI 600 may include other unused bitfields as shown at 608.

In some particular aspects, DCI 600 may be configured in a non-scheduling DCI format 0_1 or a non-scheduling DCI format 0_2. In another aspect, the value $\delta_{SRSb,f,c}$ (m) is indicated in either non-scheduling DCI format 0_1 or non-scheduling DCI format 0_2. In further aspects, the mapping of the TPC command fields (e.g., 602 or 606) into either the non-scheduling DCI format 0_1 or the non-scheduling DCI format 0_2 to accumulated $\delta_{SRSb,f,c}$ or $\delta_{PUSCHb,f,c}$ values or absolute $\delta_{SRSb,f,c}$ or $\delta_{PUSCHb,f,c}$ values may follow the following Table 1 below.

TABLE 1

| TPC Command Field | Accumulated $\delta_{PUSCH, b, f, c}$ or $\delta_{SRS, b, f, c}$ [dB] | Absolute $\delta_{PUSCH, b, f, c}$ or $\delta_{SRS, b, f, c}$ [dB] |
|---|---|---|
| 0 | −1 | −4 |
| 1 | 0 | −1 |
| 2 | 1 | 1 |
| 3 | 3 | 4 |

In some other aspects, a separate table may be configured for $\delta_{SRSb,f,c}$ when SRS is triggered using non-scheduling DCI with either finder or larger power adjustment in dB values. An example is shown in Table 2 below.

TABLE 2

| TPC command Field | Accumulated $\delta_{SRS, b, f, c}$ [dB] | Absolute $\delta_{SRS, b, f, c}$ [dB] |
|---|---|---|
| 0 | −2 | −6 |
| 1 | 0 | −2 |
| 2 | 2 | 2 |
| 3 | 4 | 6 |

With respect to multiple power control adjustment states, it is noted that 3GPP standards do not account for having SRS power control separate from PUSCH power control (and, in particular, with respect to a closed loop power control adjustment state) while allowing for two separate closed loop adjustment states only for SRS. Two closed loop adjustment states were typically only possible for SRS when they were shared with PUSCH closed loop power control adjustment states (and if PUSCH is configured with a "twoPUSCH-PC-AdjustmentStates" parameter). Notwithstanding, it is possible to have two power control adjustment states for SRS resource sets with separate power control from that of PUSCH power control. In such case, the network configures a "twoSRS-PC-AdjustmentStates" parameter for the UL component carrier (CC) in which the SRS resource set is configured as:

$$h_{b,c,f}(i, l) = h_{b,c,f}(i - i_0, l) + \sum_{m=0}^{C(S_l)-1} \delta_{SRS,b,f,c}(m, l), l = 0, 1$$

where the term $h_{b,c,f}(i-i_0,l)$ is an accumulation of TPC commands for SRS transmission occasion (i−i₀) with an adjustment state 1 and the term $\Sigma_{m=0}^{C(S_l)-1}\delta_{SRS,b,f,c}(m, l)$, l=0.1 is the sum of new TPC command values (in DCIs 2_3) since the transmission occasion (i−i₀) for SRS power control adjustment state 1.

Of further note, a DCI may trigger multiple SRS resource sets that are configured with at least four different PC adjustment states. A first state is where the PC adjustment state for SRS is the same as PUSCH with adjustment state l=0. A second state is where the PC adjustment state is the same as PUSCH with an adjustment state l=1. A third state is where the PC adjustment state is separate from the PUSCH PC with an adjustment state l=0. Finally, a fourth adjustment state is where the PC adjustment state is separate from the PUSCH PC with an adjustment state l=1. If a DCI is configured to carry two TPC commands (e.g., same as PUSCH $\delta_{PUSCH}$ and a separate $\delta_{SRS}$), then whether the TPC command applies to first or second adjustment states, 3GPP has specified that for a scheduling DCI, the SRI bitfield is used to indicate the adjustment states and for a GC-DCI formant 2-2, the l value is explicitly indicated. For a non-scheduling DCI, the SRI bitfield may be repurposed. Accordingly, an indication of the adjustment states needs to be indicated. In particular, as known from 3GPP, if a UE is provided with SRI-PUSCH-PowerControl, the UE obtains a mapping between a set of values for the SRI field in a DCI form scheduling the PUSCH transmission of the l value (or values) provided by an sri-PUSCH-ClosedLoopIndex and determines the l value that is mapped to the SRI field value. If the PUSCH transmission is scheduled by a DCI format that does not include an SRI field or if an SRI-PUSCH-PowerControl is not provided to the UE, l=0. Furthermore, if a UE obtains one TPC command from a DCI format 2_2 with CRC scrambled by a TPC-PUSCH-RNTI, the l value is provided by the closed loop indicator field in DCI format 2_2.

In light of above, when there are multiple TPC commands and states that may be configured in the non-scheduling DC, a number of different scenarios or configurations are possible for determining or indicating the power adjust state for the SRS TPC. For the condition where the SRI bitfield in the non-scheduling DCI is not reused or repurposed for other functionalities, a number of options are possible. In one option, the DCI may be configured to follow the current 3GPP specifications for determining power adjust states for the PUSCH TPC command (based on SRI).

Figure 7A:
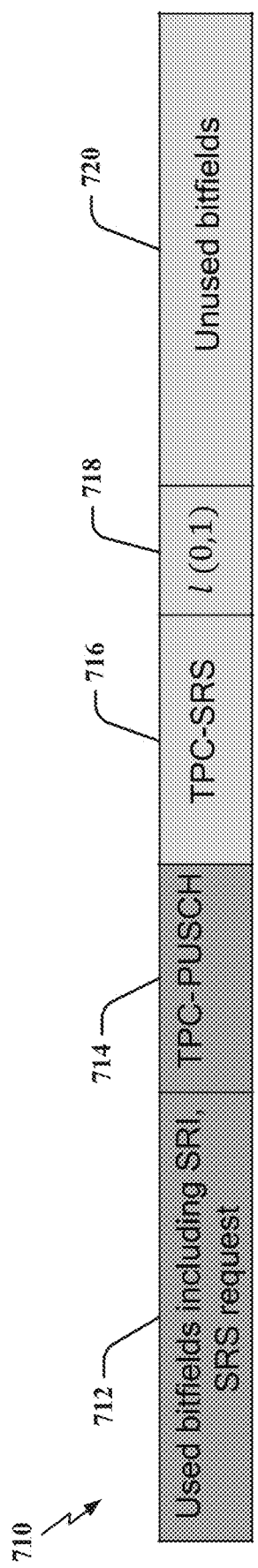
FIGS. 7A-7C illustrate different configurations for DCI including TPC for PUSCH and SRS that includes an indication of TPC SRS power adjust states according to some aspects.

For determination and/or indication of the power state for SRS TPC, on the other hand, in one option the power state may be explicitly indicated in the non-scheduling DCI. For example, this explicit indication may utilize a repurposed one-bit bitfield in the DCI as this indication. As an example of this configuration, FIG. 7A shows a configured non-scheduling DCI 710 where the TPC SRS power adjust state is indicated. In particular, FIG. 7A illustrates a DCI 710 having used bitfields 712 including SRI and an SRS request. Additionally, a TPC command bitfield 714 for PUSCH is included. Further, the DCI 710 includes the TPC command bitfield 716 for SRS. In this example, DCI 710 further includes an explicit indication of the power adjust state l in a single-bit bitfield 718. Additionally, the DCI 710 may include other unused bits/bitfields 720.

Figure 7B:
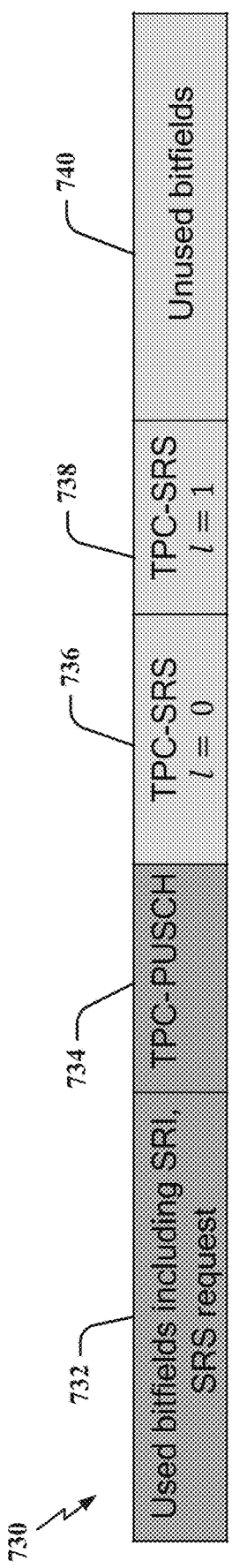

In another option, two SRS TPC commands may be explicitly indicated for l=0 and l=1. As an example, FIG. 7B shows a configured non-scheduling DCI 730 where the TPC SRS power adjust state is indicated. In particular, FIG. 7B illustrates a DCI 730 having used bitfields 732 including SRI and an SRS request. Additionally, a TPC command bitfield 734 for PUSCH is included. Further, the DCI 730 includes two TPC command bitfields for each respective power adjust state for SRS TPC. In this example, DCI 730 includes an explicit indication of the power adjust state l=0 in a bitfield 736. Additionally, DCI 730 includes an explicit indication of the power adjust state l=1 in a second bitfield 738. The DCI 730 may include other unused bits/bitfields as shown at 740.

In yet another option for indicating the power state, the SRS request bitfield may implicitly indicate the power state. In one example of this indication, for a triggered SRS resource set with multiple trigger states, one trigger state is labeled (e.g., by RRC) as an indicator that the TPC command applies to which state. In another alternative, if all triggered sets are configured with same adjustment state such as l=0 (or l=1), then the TPC command is applied to state l=0 (or l=1).

In still another alternative, the determination or indication of the power adjust state may be made according other predetermined rules. For example, in one alternative, the TPC command may be predetermined to apply to both states. In another example, the TPC command may apply to the state with larger number of triggered SRS resource sets. For example, where five triggered sets total have two triggered SRS resource sets that are configured with l=0 and three triggered SRS resource sets that are configured with l=1, the TPC would map to state l=1, which has the greater number of SRS resource sets. In yet another example, the TPC command applies to power adjust state corresponding to SRS resource set with largest/smallest set ID.

Figure 7C:
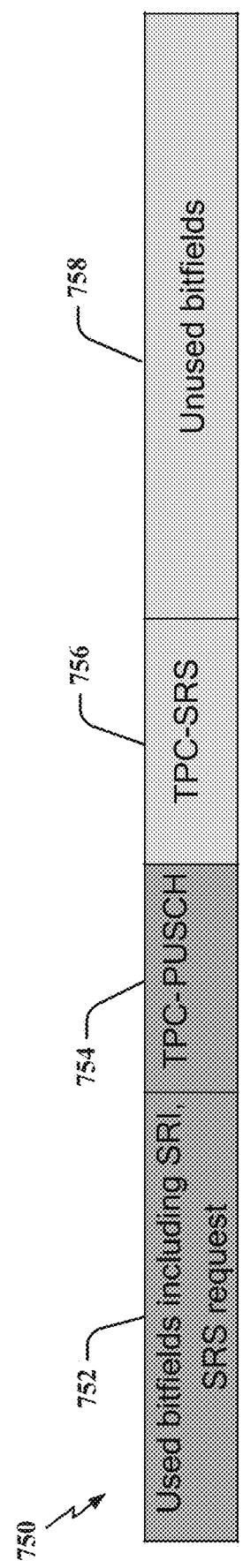

FIG. 7C illustrates an exemplary DCI configuration for the implicit indication scenarios discussed above. As shown, a DCI 750 includes used bitfields 752 including SRI and an SRS request. Additionally, a TPC command bitfield 754 for PUSCH is included. Further, the DCI 750 includes a TPC command bitfield 756 without an explicit indication of the power adjust state. The DCI 750 may include other unused bits/bitfields as shown at 758. It is noted that both of the examples illustrated by FIG. 7C implicitly indicating the power adjust state are applicable to a scheduling DCI format with an added TPC command for SRS. In some scenarios, the TPC command may have a default state (l=0) if the non-scheduling DCI doesn't indicate which power state.

Figure 8A:
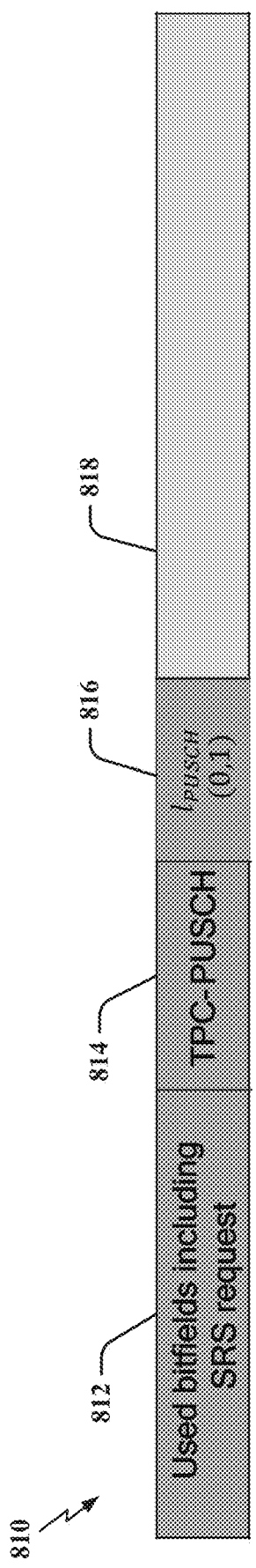
FIGS. 8A-8C illustrate examples of different configurations for DCI including TPC for PUSCH and SRS that includes an indication of TPC SRS power adjust states according to some aspects.

In another scenario where multiple TPC commands and states are indicated in a non-scheduling DCI, the SRI bitfield may be repurposed for other functionalities. In this case, determination of the power state for SRS TPC may follow the examples discussed above in connection with FIGS. 7A-7C and are not repeated here. For determination of the power state for the PUSCH TPC command, however, various options are further possible. In a first option, the power state for PUSCH TPC may be explicitly indicated in the DCI. As an example, FIG. 8A illustrates this option with DCI 810. This DCI 810 includes used bitfields 812 including the SRS request, but not SRI. Additionally, DCI 810 includes the TPC command 814 for the PUSCH. Further, an explicit indication of the adjust power state l is provided in a single-bit bitfield 816 which may be a repurposed one-bit bitfield. Additionally, other bitfields 818 are shown and may include the TPC commands for SRS as discussed in relation to FIGS. 7A-7C, for example.

Figure 8B:
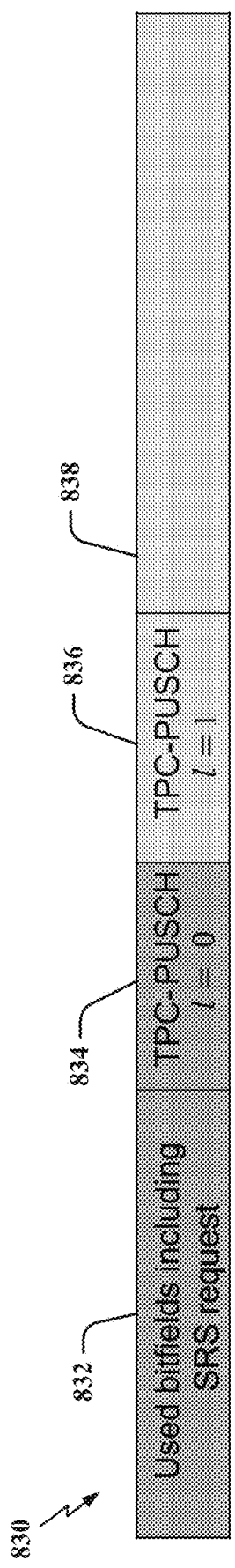

In another option, two TPC commands for the different PUSCH power states may be indicated in a DCI. As an example, FIG. 8B shows DCI 830 that includes used bitfields 832 including the SRS request, but not SRI. Additionally, DCI 830 includes first TPC command 834 for the PUSCH that indicates adjust power state l=0. Further, an explicit indication of the adjust power state l=1 is provided in a second TPC command in bitfield 836. Additionally, other bitfields 838 are shown and may include the TPC commands for SRS as discussed in relation to FIGS. 7A-7C, for example.

In another option, two TPC commands for the different PUSCH power states may be indicated in a DCI. As an example, FIG. 8B shows DCI 830 that includes used bitfields 832 including the SRS request, but not SRI. Additionally, DCI 830 includes first TPC command 834 for the PUSCH that indicates adjust power state l=0. Further, an explicit indication of the adjust power state l=1 is provided in a second TPC command in bitfield 836. Additionally, other bitfields 838 are shown and may include the TPC commands for SRS as discussed in relation to FIGS. 7A-7C, for example.

Figure 8C:
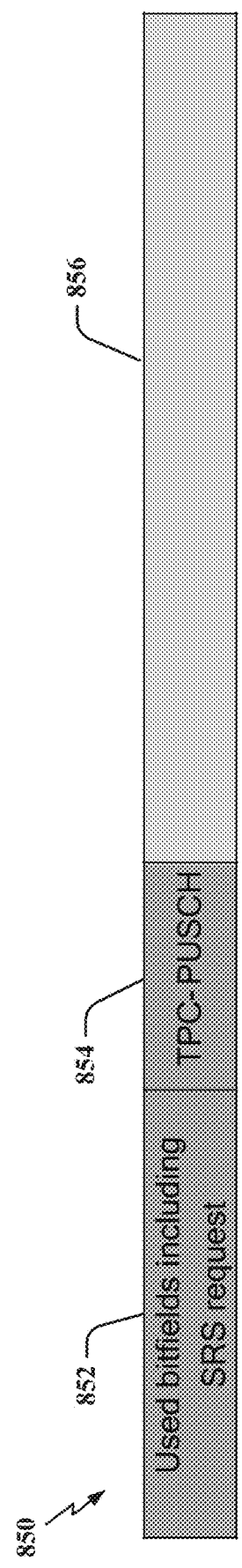

In yet another option where the SRI bitfield may be repurposed, the power state for the PUSCH TPC may be implicitly indicated through preconfiguration, predetermination, or some other a priori configuration at the base station and/or UE. As an illustration of this scenario, FIG. 8C shows a DCI 850 including used bitfields 832 including the SRS request, but not SRI. Additionally, DCI 850 includes a TPC command 854 for the PUSCH. In some examples, the PUSCH TPC command applies to default power state (e.g., l=0). The presence of the bitfield 854 or the location thereof in the DCI 850 may, for example, implicitly indicate the power adjust state for the PUSCH TPC. Additionally, other bitfields 856 are shown and may include the TPC commands for SRS as discussed in relation to FIGS. 7A-7C, for example.

Of further note, a non-scheduling DCI may be configured to trigger A-SRS for a group or set of component carriers (CC), such as in a carrier aggregation (CA) scenario. Here, a DCI bitfield (e.g., CIF or some other repurposed bitfield) may be configured to indicate which CC set is triggered. The DCI payload may contain multiple TPC commands for each CC within the CC set. The CC could be configured with PUSCH (e.g., SRS PC could be the same as the PUSCH or separate). Otherwise, if the PUSCH is not configured, SRS has a separate power control. Thus, in an aspect, the non-scheduling DCI (e.g., DCI format 0_1 or DCI format 0_2) trigger A-SRS on a group of CCs (i.e., a CC set) may be configured to indicate one or more TPC commands per each CC in the CC set. In further aspects, if the CC is not configured with PUSCH, a single TPC command may be indicated. Of note here, in the where case two power adjustment states are configured, then similar rules as discussed in connection with FIGS. 7A-7C may be followed to determine the power state adjustment value (e.g., l=0 or 1). If the CC is configured with PUSCH, two TPC commands may be indicated; i.e., one for PUSCH and other one for SRS. Again, similar rules to those discussed above in connection with FIG. 7A-7C or 8A-8C may be used to determine the power adjustment state.

Figure 9A:
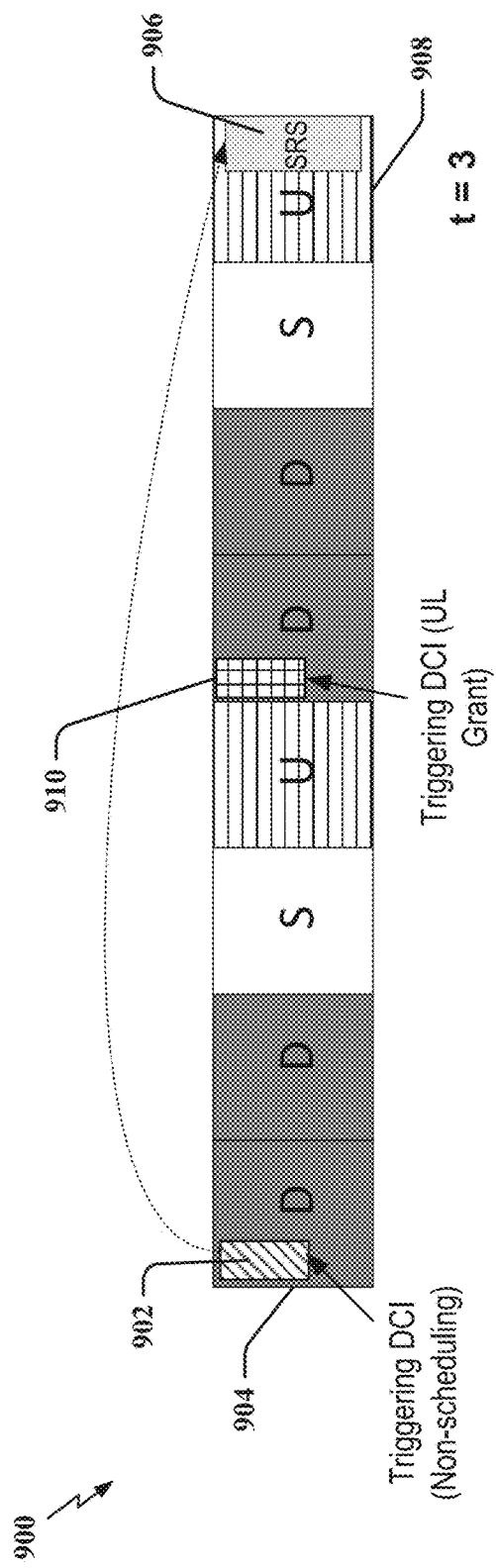
FIGS. 9A and 9B illustrate examples of transmission timelines of a number of slots with non-scheduling and scheduling triggering DCI according to some aspects.

In other aspects, it is noted that UEs may be configured with TPC power accumulation where the TPC commands received from a base station are accumulated, which was mentioned above. In the case where when a UE receives non-scheduling or "dummy" DCI indicating both an SRS TPC command and triggering an A-SRS resource set at some time (e.g., t=3 indicating SRS transmission at a fourth UL slot or time instance starting at zero through 3), the UE may, in the interim time period, receive a DCI with a UL grant and another TPC command for PUSCH TPC, as an example. As an illustration of this scenario, FIG. 9A shows a time flow diagram 900 of a number of DL slots/symbols (D), flexible slots/symbols (S), and UL slots/symbols (U). In this example, a triggering DCI 902 that is non-scheduling is received by UE during a downlink slot/symbol 904. This triggering DCI 902 schedules transmission of an SRS resource set 906 at a future UL slot/symbol 908. In this example, the slot/symbol may be at a time or symbol/slot number of t=3 which is the fourth UL slot, but this is exemplary and not limited to such.

In the interim time, the UE may receive another triggering DCI 910 during a downlink slot/symbol 912. In this example, the DCI 910 may include an UL grant, as well as a PUSCH TPC command. Accordingly, in the case of TPC power accumulation the UE has two option—either to continue TPC accumulation or to ignore TPC commands received between a non-scheduling triggering DCI and the SRS transmission. Accordingly, in one configuration, the UE may be configured to not consider the TPC command in interim DCI received such as DCI 910 (or multiple DCI received in the period between DCI 902 and SRS 906). In another configuration, the UE may continue TPC accumulation from the time of the triggering DCI 902 to the time instance of the SRS transmission 906.

Figure 9B:
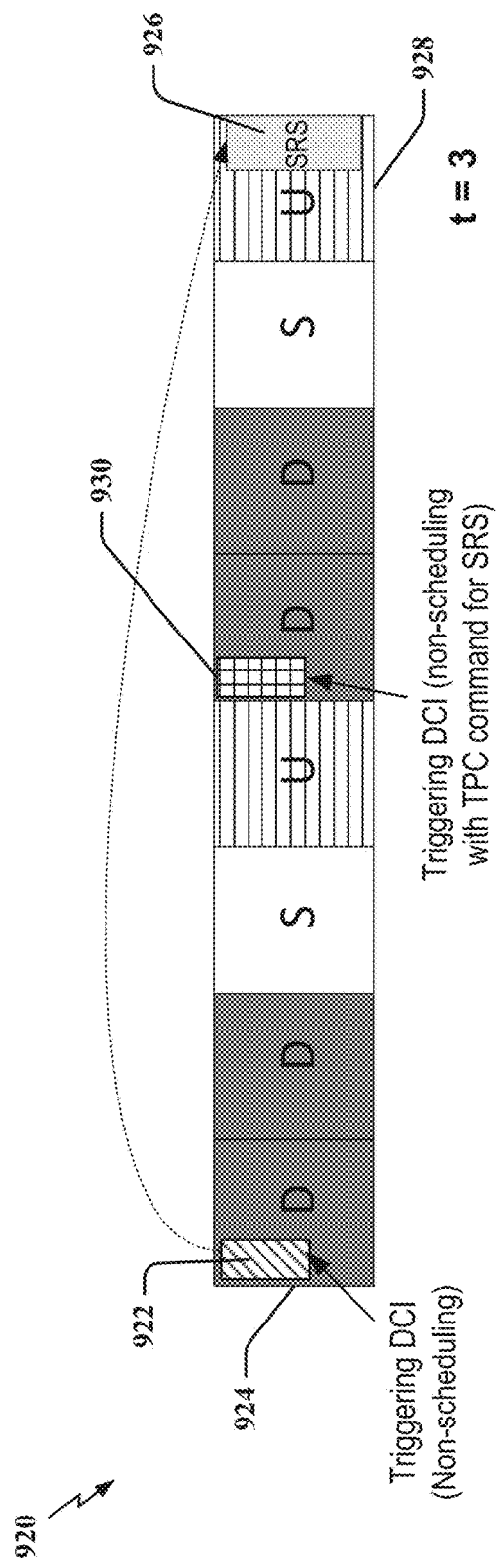

FIG. 9B illustrates another timeline 920 showing another example for SRS transmission with separate power control. In this example, the DCI 922 is a triggering DCI in a slot/symbol 924 that includes a TPC command for SRS for an SRS transmission 926 in a subsequent UL slot/symbol 928. In this example, before the SRS transmission 926 during slot/symbol 928, the UE may receive another non-scheduling DCI 930 that indicates another TPC command for SRS transmission. Accordingly, in the case of TPC power accumulation, the UE has two options—(1) continue TPC accumulation, or (2) ignore the SRS TPC command received in the second non scheduling DCI 930.

Of further note, in the case of TPC accumulation for a non-scheduling DCI, it is noted that if the srs-PowerControlAdjustmentStates indicates a separate power control adjustment and the UE is configured with higher layer parameter 'SRSClosedLoopPowerAdjustment' using the non-scheduling DCI, the update of the power control adjustment state for SRS transmission occasion i may occur at the beginning of each SRS resource in the SRS resource set $q_s$; otherwise, the update of the power control adjustment state SRS transmission occasion i occurs at the beginning of the first transmitted SRS resource in the SRS resource set $q_s$.

Furthermore, concerning the SRS power control timeline, it is noted that the relationship $$\sum_{m=0}^{C(S_i)-1} \delta_{SRS,b,f,c}(m)$$

represents a sum of TPC command values in a set $S_i$ of TPC command values with a cardinality $C(S_i)$ that the UE receives between $K_{SRS}(i-i_0)-1$ symbols before the SRS transmission occasion $i-i_0$ and $K_{SRS}(i)$ symbols before SRS transmission occasion i on an active UL BWP b of a carrier f of serving cell c for SRS power control adjustment state, where $i_0>0$ is the smallest integer for which $K_{SRS}(i\ i-i_0)$ symbols before SRS transmission occasion $i-i_0$ is earlier than $K_{SRS}(i)$ symbols before SRS transmission occasion i. If the SRS transmission is aperiodic (i.e., A-SRS), $K_{SRS}(i)$ is a number of symbols for active UL BWP b of carrier f of serving cell c after a last symbol of a corresponding PDCCH triggering the SRS transmission and before a first symbols of the SRS transmission.

In further aspects, it is noted that SRS TPC may be configured to be an instantaneous or one-time power boost (or power back off or reduction). For example, FIG. 10 illustrates a scenario where an SRS-TPC command 1002 at slot/symbol 1004 is considered as one-time power adjustment on top of a closed loop power control for just the corresponding triggered SRS transmission, shown at 1006.

Figure 10:
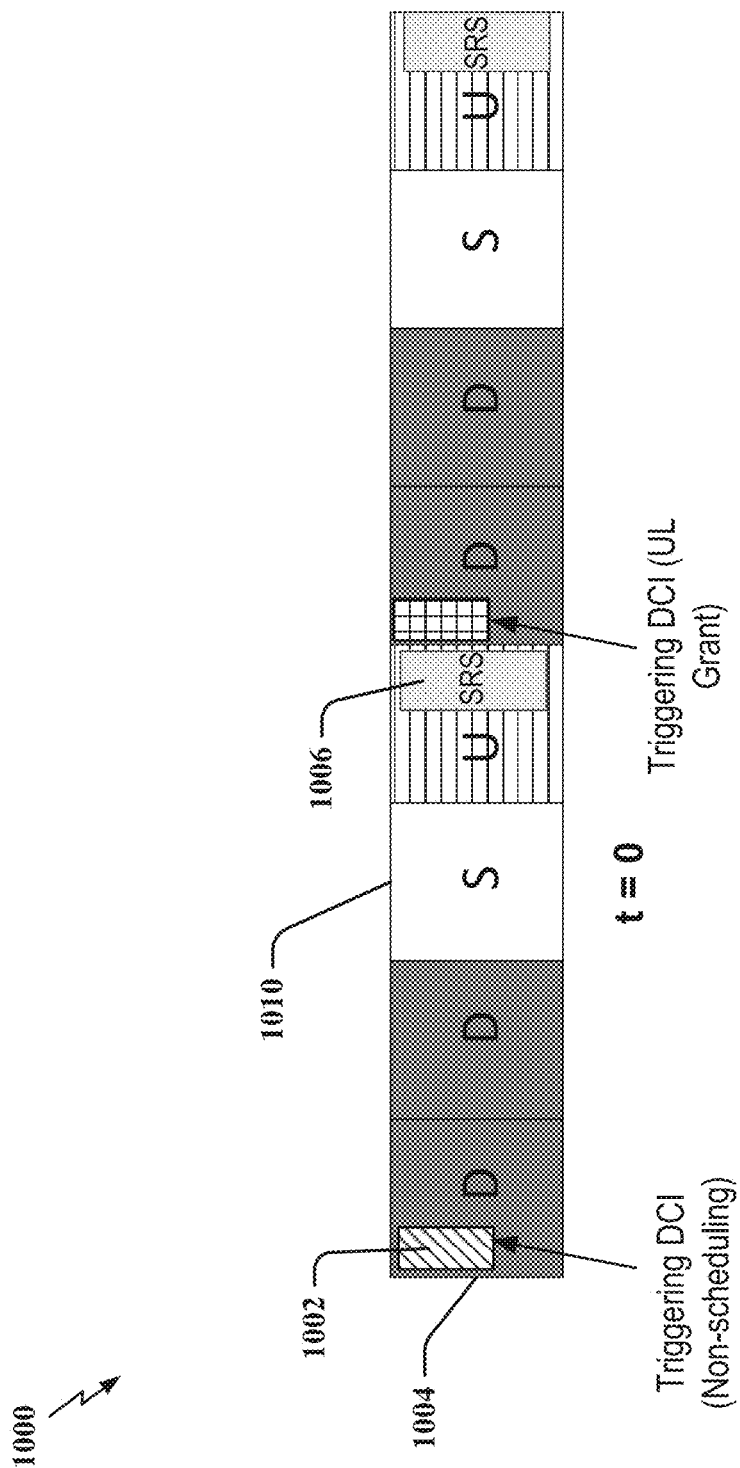
FIG. 10 illustrates another example of a transmission timeline of a number of slots with non-scheduling and scheduling triggering DCI according to some aspects.

In the example or scenario of FIG. 10, the resource set for a one-time power adjustment may be configured at least a couple of ways. According to a first case, the resource set may be configured with the same PC state as the PUSCH→$f_{b,f,c}(i,l)+\delta_{SRS}$. In a second case, the resource set may be configured with a separate PC state $h_{b,f,c}(i,l)+\delta_{SRS}$, which is independent of the PC state of the PUSCH.

Figure 11:
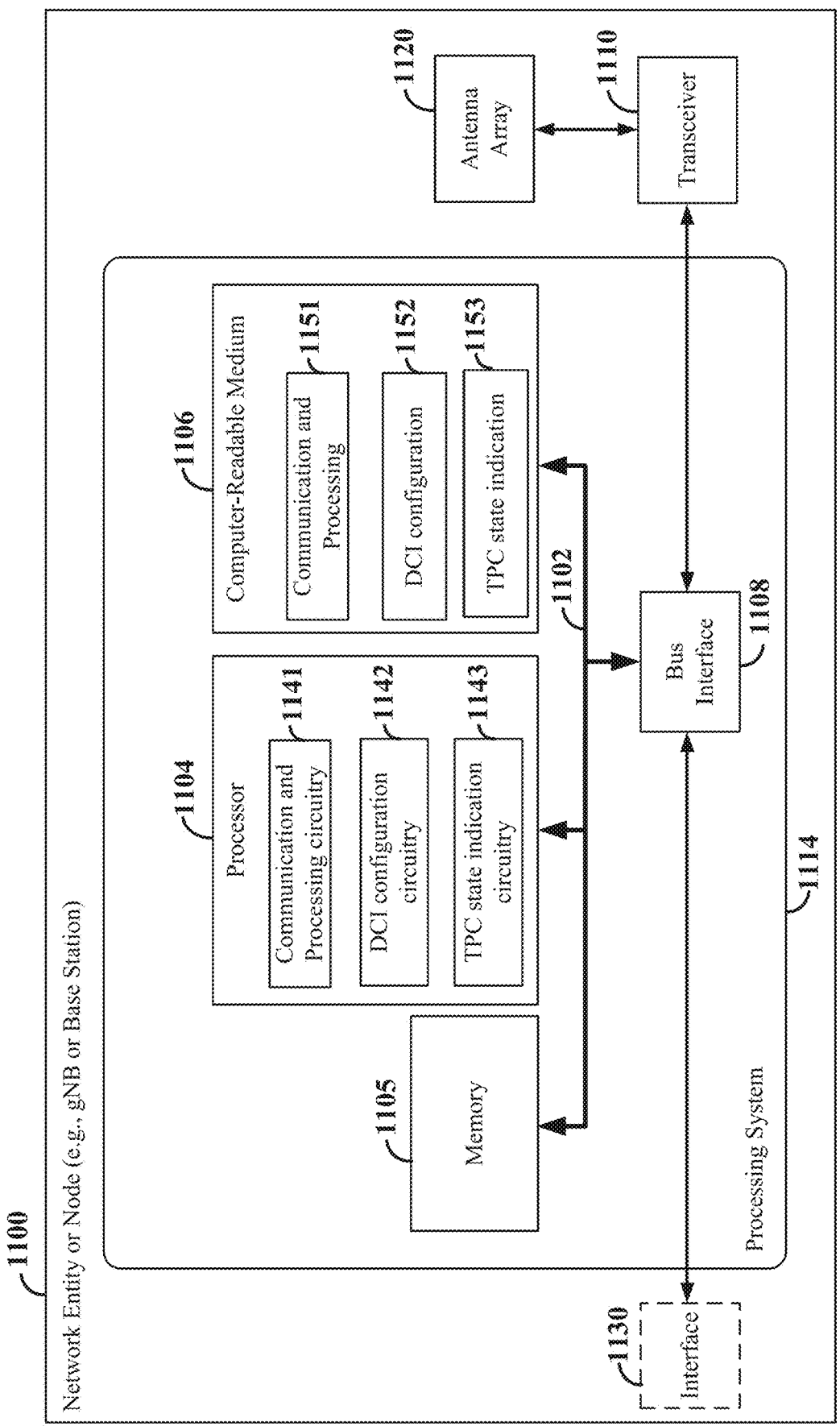
FIG. 11 is a block diagram illustrating an example of a hardware implementation for network entity or node employing a processing system according to some aspects.

FIG. 11 is a block diagram conceptually illustrating an example of a hardware implementation for a network entity or node 1100 employing a processing system 1114 according to some aspects of the disclosure. In accordance with various aspects of the disclosure, an element, or any portion of an element, or any combination of elements may be implemented with a processing system 1114 that includes one or more processors 1104. In some implementations, the network node 1100 may correspond to any of the BSs (e.g., gNBs, eNBs, etc.) or scheduling entities shown in either of FIGS. 1 and 2. In further aspects, the network entity or node 1100 may be configured as a base station operable within an Open RAN (O-RAN) environment, wherein the base station (e.g., 1100) is disaggregated and includes distinct parts including a distributed unit (DU), a centralized unit (CU), and a radio unit (RU). In yet further aspects, the disclosed and illustrated processing portions of network entity 1100 may be implemented within the RU, DU and/or the CU or within portions of each.

The network node 1100 may be implemented with a processing system 1114 that includes one or more processors 1104. Examples of processors 1104 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the network node 1100 may be configured to perform any one or more of the functions described herein. That is, the processor 1104, as utilized in network node 1100, may be used to implement any one or more of the processes and procedures described herein.

In this example, the processing system 1114 may be implemented with a bus architecture, represented generally by the bus 1102. The bus 1102 may include any number of interconnecting buses and bridges depending on the specific application of the processing system 1114 and the overall design constraints. The bus 1102 communicatively couples together various circuits including one or more processors (represented generally by the processor 1104), a memory 1105, and computer-readable media (represented generally by the computer-readable medium 1106). The bus 1102 may also link various other circuits such as timing sources, peripherals, voltage regulators, and power management circuits, which are well known in the art, and therefore, will not be described any further. A bus interface 1108 provides an interface between the bus 1102 and a transceiver 1110 and between the bus 1102 and an interface 1130. The transceiver 1110 provides a communication interface or means for communicating with various other apparatus over a wireless transmission medium. In some examples, the wireless communication device may include two or more transceivers 1110, each configured to communicate with a respective network type (e.g., terrestrial or non-terrestrial). At least one interface 1130 (e.g., a network interface and/or a user interface) provides a communication interface or means of communicating with various other apparatus and devices (e.g., other devices housed within the same apparatus as the network node 1100 or an external apparatus) over an internal bus or external transmission medium, such as an Ethernet cable.

The processor 1104 is responsible for managing the bus 1102 and general processing, including the execution of software stored on the computer-readable medium 1106. The software, when executed by the processor 1104, causes the processing system 1114 to perform the various functions described below for any particular apparatus. The computer-readable medium 1106 and the memory 1105 may also be used for storing data that is manipulated by the processor 1104 when executing software.

One or more processors 1104 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1106.

The computer-readable medium 1106 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1106 may reside in the processing system 1114, external to the processing system 1114, or distributed across multiple entities including the processing system 1114. The computer-readable medium 1106 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1100 may be configured to perform any one or more of the operations described herein (e.g., as described above in conjunction with FIGS. 1-10 and as described below in conjunction with FIG. 12). In some aspects of the disclosure, the processor 1104, as utilized in the network node 1100, may include circuitry configured for various functions.

The processor 1104 may be configured to generate, schedule, and modify a resource assignment or grant of time-frequency resources (e.g., a set of one or more resource elements). For example, the processor 1104 may schedule time-frequency resources within a plurality of time division duplex (TDD) and/or frequency division duplex (FDD) subframes, slots, and/or mini-slots to carry user data traffic and/or control information to and/or from multiple UEs.

The processor 1104 may be configured to schedule resources for the transmission of downlink reference signals (e.g., SSBs or CSI-RSs) or DCI (or SRS triggering) on a plurality of downlink beams for a downlink beam sweep in accordance with a selected downlink beam sweep type and selected number of downlink reference signal resources indicated in a request for uplink beam refinement received from a UE. The processor 1104 may further be configured to schedule resources for the uplink transmission of uplink reference signals (e.g., SRSs) on a plurality of uplink beams for an uplink beam sweep in accordance with a selected beam sweep type and selected number of uplink reference signal resources indicated in the request. The processor 1104 may further be configured to schedule resources that may be utilized by the UE to transmit the request. For example, the uplink beam refinement request resources may include resources scheduled for transmission of a PUCCH, PUSCH, Physical Random Access Channel (PRACH) occasion or RRC message. In some examples, the processor 1104 may be configured to schedule PUSCH resources for the uplink beam refinement request in response to receiving a scheduling request from the UE.

The processor 1104 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

The processor 1104 may include communication and processing circuitry 1141. The communication and processing circuitry 1141 may include one or more hardware components that provide the physical structure that performs various processes related to wireless communication (e.g., signal reception and/or signal transmission) as described herein. The communication and processing circuitry 1141 may further include one or more hardware components that provide the physical structure that performs various processes related to signal processing (e.g., processing a received signal and/or processing a signal for transmission) as described herein. In some examples, the communication and processing circuitry 1141 may include two or more transmit/receive chains. The communication and processing circuitry 1141 may further be configured to execute communication and processing software 1151 included on the computer-readable medium 1106 to implement one or more functions described herein.

In some examples, the communication and processing circuitry 1141 may be configured to trigger A-SRS in a UE via transceiver 1110 and antenna array 1120, such as through DCI in the PDCCH. Additionally, the communication and processing circuitry 1141 may be configured to receive and process the uplink A-SRS signals received from the UE.

In some other examples, the communication and processing circuitry 1141 may be configured to communicate higher layer information such as RRC configuration information to a UE. For example, the communication and processing circuitry 1141 may communicate RRC parameters to UEs that indicate whether or not a non-scheduling DCI transmitted will include an extra TPC for SRS power control, and further if that power control is separate from PUSCH power control, for example. Other higher layer information that may be determined and sent with the communication and processing circuitry 1141 may include RRC information indicating, for a triggered SRS resource set with multiple trigger states, that one trigger state is labeled as an indicator that TPC command applies to which power adjustment state.

The processor 1104 may further include DCI configuration circuitry 1142 configured to configure, construct, or determine the non-scheduling DCI structure that is sent to the UE for triggering of SRS resource set(s). This circuitry 1142 may be configured to configure the non-scheduling DCI to include TPC commands for A-SRS to be sent to a UE, as well as TPC commands for the PUSCH, such as shown in FIG. 6, for example. Additionally, circuitry 1142 may be configured to construct the non-scheduling DCI to include power adjustment state information, indications, or values as was discussed in connection with FIG. 7A-7C or 8A-8C, for example. Additionally, the DCI configuration circuitry 1142 may be configured to decide which bitfields in a non-scheduled DCI are to be repurposed or reused for communicating TPC commands and power adjustment states to the UE. Furthermore, the DCI configuration circuitry 1142 may be configured to operate in accordance with the various processes disclosed herein in connection with FIGS. 5-10 and 12. The DCI configuration circuitry 1142 may further be configured to execute DCI configuration circuitry software 1152 included on the computer-readable medium 1106 to implement one or more functions described herein.

In some further examples, the processor 1104 may further include TPC state indication circuitry 1143, which is configured to assist the DCI configuration circuitry 1142 for indicating power adjustment states for the TPC commands, either for SRS or the PUSCH. In aspects, the TPC state indication circuitry 1143 may include determining whether a DCI is configured to explicitly include power adjustment state information, such as was discussed in connection with FIG. 7A, 7B, 8A, or 8B. The TPC state indication circuitry 1143 may further be configured to execute TPC state indication software 1153 included on the computer-readable medium 1106 to implement one or more functions described herein.

Figure 12:
FIG. 12 is a flow chart illustrating a method for configuring and transmitting a DCI in a network entity or node according to some aspects.

FIG. 12 is a flow chart illustrating an example wireless communication method 1200 according to some aspects of the disclosure. As described herein, some or all illustrated features may be omitted in a particular implementation within the scope of the present disclosure, and some illustrated features may not be required for implementation of all embodiments. In some examples, the method 1200 may be carried out by the network node 1100 (e.g., a gNB or base station) illustrated in FIG. 11. In some examples, the method 1200 may be carried out by any suitable apparatus or means for carrying out the functions or algorithm described below.

At block 1202, the method 1200 includes configuring downlink control information (DCI) to include a plurality of transmit power control (TPC) commands. The TPC command in the DCI include a first TPC command of the plurality of TPC commands configured for power control of a physical uplink shared channel (PUSCH) and a second TPC command of the plurality of TPC commands configured for power control of one or more sounding reference signal (SRS) resource sets. In an aspect, the processes of block 1202 may implemented by a means for configuring the DCI, which may be implemented by processor 1104, and DCI configuration circuitry 1142, in a particular aspect, or equivalents thereof.

Additionally, method 1200 includes transmitting the DCI to at least one user equipment (UE) for triggering SRS as shown in block 1204. The DCI may be configured as a non-scheduling DCI configured to trigger the one or more SRS sets. Additionally, method 1200 may include that at least the second TPC command is placed in reused bitfields of the non-scheduling DCI, wherein the reused bitfields comprise one or more bitfields that are configured in a scheduling DCI for scheduling of transmission resources.

In other aspects, it is noted that method 1200 may apply to a scenario where the one or more SRS sets are aperiodic SRS sets triggered by the DCI. Furthermore, the first TPC command may be independent from the second TPC command or the same power control for each of the PUSCH and the one or more SRS resource sets. Further, the first and second TPC commands may implement a different power control for each of the respective PUSCH and the one or more SRS resource sets. In other aspects, the DCI is formatted according to a DCI format 0_1 or a DCI format 0_2.

In yet other aspects, method 1200 may further include that the DCI includes an indication of a power adjustment state for the second TPC command configured for power control of the one or more SRS resource sets. In some examples, indication of the power adjustment state comprises at least one bit in the DCI indicating one of two power adjustment states, such as was illustrated in FIG. 7A, for example. In other aspects, the DCI may be configured to include the second TPC command comprising a first bitfield with the second TPC command and a first power adjustment state and a second bitfield with the second TPC command and a second power adjustment state, such as was illustrated in FIG. 7B, for example.

Method 1200 may also include that the indication comprises signaling or configuration communicated by the base station to the UE configured to allow the UE to derive the power adjustment state based on characteristics of the second TPC command in the DCI. In one example, characteristics of the second TPC command include, for a triggered SRS resource set having multiple trigger states, one trigger state of the multiple trigger states designated as the indication for communicating which of two power adjustment states indicator to which the TPC command applies. In another example, the characteristics of the second TPC command include, for multiple triggered SRS resource sets, a configuration wherein all of the multiple triggered sets are configured with a same power adjustment state indicates that the second TPC command applies to the same power adjustment state. In yet another example, the indication comprises signaling or configuration communicated to the UE to allow the UE to derive the power adjustment state based on at least one predetermined condition or setting. Further, the at least one predetermined condition or setting comprises a predetermination that the second TPC command is applicable to both of two available power adjustment states. In another, aspect the second TPC command is applicable to a default power state adjustment (i.e., the default power state for the UE is itself adjusted or modified, or, alternatively, the default power state is adjusted to some new value that is used for TPC).

In yet other aspects, method 1600 may include that at least one predetermined condition or setting comprises applying the second TPC command with a power adjustment state associated with the power adjustment state corresponding to either a larger or smaller number of triggered SRS resource sets of multiple triggered SRS resource sets. Further, at least one predetermined condition or setting comprises applying the second TPC command with a power adjustment state associated with the power adjustment state corresponding to either a larger or smaller set identifier (set ID) of triggered SRS resource sets of multiple triggered SRS resource sets. In one example, the DCI includes an SRS resource indicator (SRI) bitfield (i.e., the bitfield was not repurposed). In yet other aspects, method 1200 includes that the DCI includes a power adjustment state indication for the first TPC command and does not include an SRS resource indicator (SRI) (i.e., the SRI bitfield has been reused or repurposed).

In other aspects of method 1200, the power adjustment state indication further includes configuring the DCI to include the first TPC command comprising a first bitfield with the first TPC command and a first power adjustment state and a second bitfield with the first TPC command and a second power adjustment state. In other aspects, the power adjustment state indication comprises signaling or configuration communicated by the base station to the UE configured to allow the UE to derive the power adjustment state based on characteristics of the first TPC command in the DCI.

In still other aspects, method 1600 may include that the DCI is further configured to indicate one or more TPC commands for each component carrier (CC) in a CC set. In a further example, the first TPC command is not included in the DCI when the CC is not configured with the PUSCH.

Figure 13:
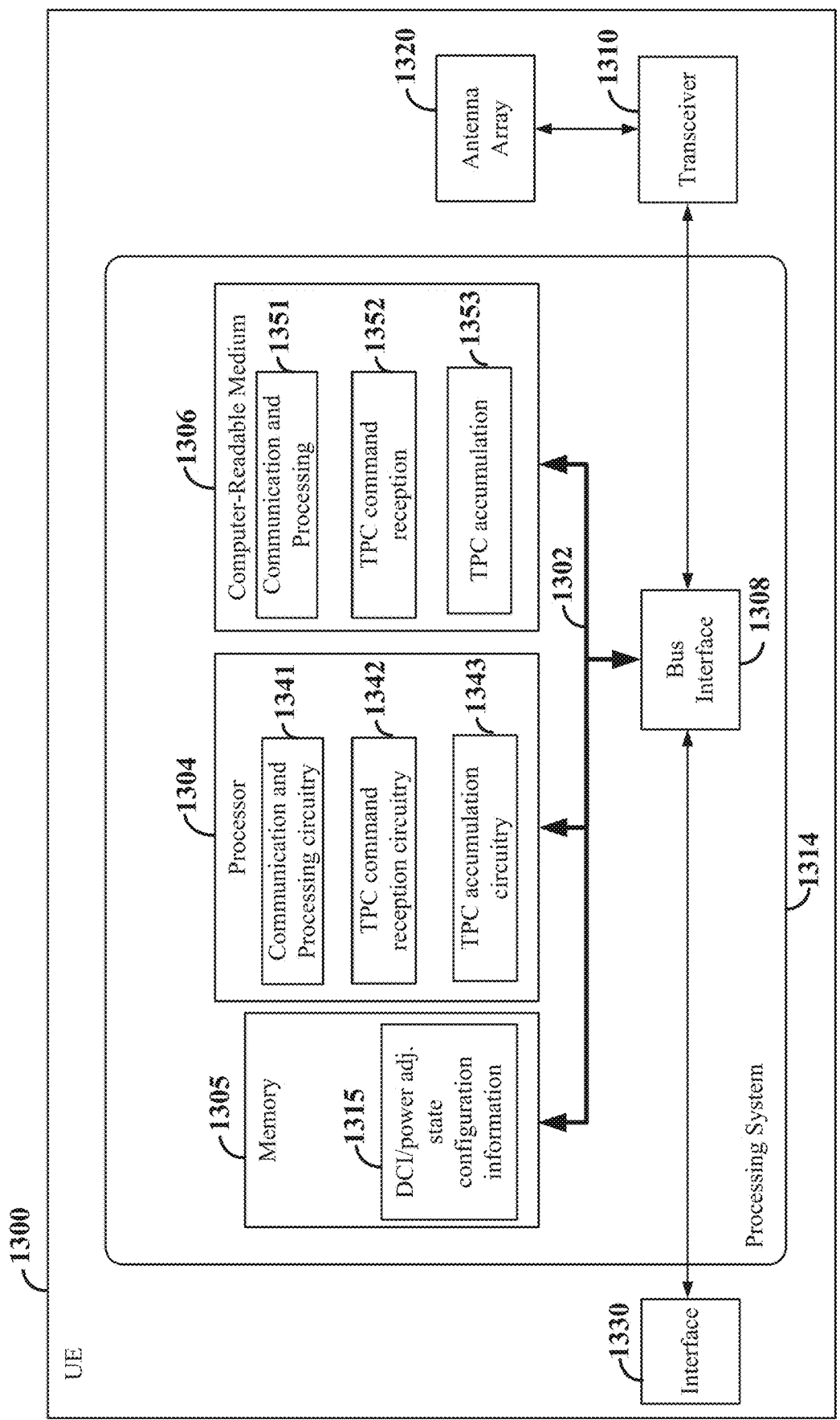
FIG. 13 is a block diagram illustrating an example of a hardware implementation for a user equipment (UE) employing a processing system according to some aspects.

FIG. 13 is a block diagram conceptually illustrating an example of a hardware implementation for a user equipment (UE) employing a processing system 1314 according to some aspects of the disclosure. In accordance with various aspects of the disclosure, an element, or any portion of an element, or any combination of elements may be implemented with a processing system 1314 that includes one or more processors 1304. In some implementations, the UE 1300 may correspond to any of the UEs or schedule entities shown in any of FIGS. 1 and 2.

The UE 1300 may be implemented with a processing system 1314 that includes one or more processors 1304. Examples of processors 1304 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the UE 1300 may be configured to perform any one or more of the functions described herein. That is, the processor 1304, as utilized in a UE 1300, may be used to implement any one or more of the processes and procedures described below.

In this example, the processing system 1314 may be implemented with a bus architecture, represented generally by the bus 1302. The bus 1302 may include any number of interconnecting buses and bridges depending on the specific application of the processing system 1314 and the overall design constraints. The bus 1302 communicatively couples together various circuits including one or more processors (represented generally by the processor 1304), a memory 1305, and computer-readable media (represented generally by the computer-readable medium 1306). The bus 1302 may also link various other circuits such as timing sources, peripherals, voltage regulators, and power management circuits, which are well known in the art, and therefore, will not be described any further. A bus interface 1308 provides an interface between the bus 1302 and a transceiver 1310 and between the bus 1302 and an interface 1330. The transceiver 1310 provides a communication interface or means for communicating with various other apparatus over a wireless transmission medium. In some examples, the wireless communication device may include two or more transceivers 1310, each configured to communicate with a respective network type (e.g., terrestrial or non-terrestrial). At least one interface 1330 (e.g., a network interface and/or a user interface) provides a communication interface or means of communicating with various other apparatus and devices (e.g., other devices housed within the same apparatus as the UE 1300 or an external apparatus) over an internal bus or via external transmission medium, such as an Ethernet cable.

The processor 1304 is responsible for managing the bus 1202 and general processing, including the execution of software stored on the computer-readable medium 1306. The software, when executed by the processor 1304, causes the processing system 1314 to perform the various functions described below for any particular apparatus. The computer-readable medium 1306 and the memory 1305 may also be used for storing data that is manipulated by the processor 1304 when executing software.

One or more processors 1304 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium 1306.

The computer-readable medium 1306 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable medium 1306 may reside in the processing system 1314, external to the processing system 1314, or distributed across multiple entities including the processing system 1314. The computer-readable medium 1306 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

The UE 1300 may be configured to perform any one or more of the operations described herein (e.g., as described above in conjunction with FIGS. 5-10 and as described below in conjunction with FIG. 14 or 15). In some aspects of the disclosure, the processor 1304, as utilized in the UE 1300, may include circuitry configured for various functions.

The processor 1304 may be configured to generate, schedule, and modify a resource assignment or grant of time-frequency resources (e.g., a set of one or more resource elements). For example, the processor 1304 may schedule time-frequency resources within a plurality of time division duplex (TDD) and/or frequency division duplex (FDD) subframes, slots, and/or mini-slots to carry user data traffic and/or control information to and/or from multiple UEs.

The processor 1304 may be configured to schedule resources for the receipt of downlink reference signals (e.g., SSBs, DCI, or CSI-RSs) on a plurality of downlink beams for a downlink beam sweep in accordance with a selected downlink beam sweep type and selected number of downlink reference signal resources indicated in a request for uplink beam refinement received from a UE. The processor 1304 may further be configured to schedule and transmit resources for the uplink transmission of uplink reference signals (e.g., SRSs or A-SRSs in response to a trigger DCI and slot offset configurations as disclosed herein) on a plurality of uplink beams for an uplink beam sweep in accordance with a selected beam sweep type and selected number of uplink reference signal resources indicated in the request. The processor 1304 may further be configured to schedule resources that may be utilized by the UE to transmit the request. For example, the uplink beam refinement request resources may include resources scheduled for transmission of a PUCCH, PUSCH, PRACH occasion, or RRC message. In some examples, the processor 1304 may be configured to schedule PUSCH resources for the uplink beam refinement request in response to transmitting a scheduling request to a network node such as a gNB or base station.

The processor 1304 may further be configured to schedule resources for the transmission of an uplink signal. In some examples, the resources may be associated with one or more uplink transmit beams and one or more corresponding receive beams applied to the uplink signal (e.g., based on the uplink BPLs) based on an indication of the uplink signal associated with the one or more uplink transmit beams included in the request. In some examples, the resources may be associated with an uplink transmission scheme indicating a number of uplink transmit beams to be utilized for the uplink signal, a number of repetitions per uplink transmit beam of the uplink signal, and a multiplexing scheme when more than one uplink transmit beam is used to transmit the uplink signal.

The processor 1304 may include communication and processing circuitry 1341. The communication and processing circuitry 1341 may include one or more hardware components that provide the physical structure that performs various processes related to wireless communication (e.g., signal reception and/or signal transmission) as described herein. The communication and processing circuitry 1341 may further include one or more hardware components that provide the physical structure that performs various processes related to signal processing (e.g., processing a received signal and/or processing a signal for transmission) as described herein. In some examples, the communication and processing circuitry 1341 may include two or more transmit/receive chains. The communication and processing circuitry 1341 may further be configured to execute communication and processing software 1351 included on the computer-readable medium 1306 to implement one or more functions described herein.

In some examples, the communication and processing circuitry 1341 may be configured to receive downlink beamformed signals at a mmWave frequency or a sub-6 GHz frequency via the transceiver 1310 and the antenna array 1320. For example, the communication and processing circuitry 1341 may be configured to receive PDCCH signals, including the triggering, non-scheduling DCI for A-SRS transmissions via at least one first antenna panel of the antenna array 1320 and transceiver 1310.

The communication and processing circuitry 1341 may further be configured to receive RRC signaling at upper layers. In one aspect, the communication and processing circuitry 1341 may receive and process the RRC layer signaling for implementing the various different TPC reception and power adjustment state indications as discussed above in connection with FIGS. 5-10 and 12. In a particular aspect, the DCI configuration and power adjustment state information that is used for implementing various aspects, including predetermined configurations, may be stored in memory 1305 as represented by DCI/power adjustment state configuration information 1315. It is noted here that, in some implementations, at least a portion of the configuration 1315 may be pre-stored or predefined and not derived from RRC signaling according to some aspects, or derived solely from RRC signaling in other aspects.

The processor 1304 also includes the TPC command reception circuitry 1342 configured to receive the various non-scheduling DCI configurations as discussed herein including receiving SRS and/or PUSCH TPC commands in a non-scheduling DCI. The TPC command reception circuitry 1342 may include functionality for determining, decoding, or obtaining power adjustment state information as discussed herein. In one aspect, the TPC command reception circuitry 1342 may derive the power adjustment state information from the received DCI, or infer the information either from RRC signaling configurations or from information stored in memory information 1315. The TPC command reception circuitry 1342 may further be configured to execute TPC command reception software 1352 included on the computer-readable medium 1306 to implement one or more functions described herein.

The processor 1304 also includes the TPC accumulation circuitry 1343 configured to determine whether or not to accumulate TPC commands in scheduling DCI received between reception of the non-scheduling DCI and the time for transmission of the SRS resource set, such as was discussed in connection with FIG. 9 above. Additionally, the TPC accumulation circuitry 1343 may further be configured to determine whether the SRS TPC command in the non-scheduling DCI is a one-time power adjustment, and further decide if the SRS resource set is to be configured with a same power control state as the PUSCH or a separate power control state as was discussed above in connection with FIG. 10, as one example. The TPC accumulation circuitry 1343 may be configured to execute the TPC accumulation software 1353 included on the computer-readable medium 1306 to implement one or more functions described herein.

FIG. 14 is a flow chart illustrating an example wireless communication method 1400 according to some aspects of the disclosure. As described herein, some or all illustrated features may be omitted in a particular implementation within the scope of the present disclosure, and some illustrated features may not be required for implementation of all embodiments. In some examples, the method 1400 may be carried out by the UE 1300 illustrated in FIG. 13. In some examples, the method 1400 may be carried out by any suitable apparatus or means for carrying out the functions or algorithm described below.

At block 1402, the UE may process downlink control information (DCI) configured to include a plurality of transmit power control (TPC) commands received from a network entity, where a first TPC command of the plurality of TPC commands is configured for power control of a physical uplink shared channel (PUSCH), and a second TPC command of the plurality of TPC commands is configured for power control of one or more sounding reference signal (SRS) resource sets. Further, the processes in block 1402 may include non-scheduling, triggering DCI reception using means for receiving the DCI, which may be implemented by processor 1304, and circuitry 1341, circuitry 1342, and/or transceiver 1310 shown in FIG. 13, or by equivalents thereof.

Method 1400 further includes the UE configuring resources for at least one of PUSCH and SRS transmissions based on the first or second TPC commands as shown at block 1402. It is noted that the processes in block 1402 may include reception using means for configuring SRS/PUSCH resources, which may be implemented by processor 1304, and circuitry 1341, circuitry 1342, circuitry 1343, memory information 1315, and/or transceiver 1310 shown in FIG. 13, or by equivalents thereof.

In some aspects, the DCI is a non-scheduling DCI configured to trigger the one or more SRS sets in the UE. In further aspects, at least the second TPC command is placed in reused bitfields of the non-scheduling DCI, wherein the reused bitfields include one or more bitfields that are configured in a scheduling DCI for scheduling of transmission resources. Further, the one or more SRS sets are aperiodic SRS sets triggered by the DCI. In other aspects, the first TPC command is independent from the second TPC command.

In yet other aspects, method 1400 may include the UE setting the transmission power of the PUSCH and SRS resource sets based respectively on the first and second TPC commands and then transmitting the PUSCH and SRS resource sets where the first and second TPC commands are configured to implement the same power control for each of the PUSCH and the one or more SRS resource sets in the UE. In other aspects, method 1400 may include the UE setting the transmission power of the PUSCH and SRS resource sets based respectively on the first and second TPC commands, and transmitting the PUSCH and SRS resource sets where the first and second TPC commands are configured to implement a different power control for each of the respective PUSCH and the one or more SRS resource sets.

In still other aspects, method 1400 may include that the DCI further includes an indication of a power adjustment state for the second TPC command configured for power control of the one or more SRS resource sets and the UE is configured to set the transmission power of the one or more SRS resource sets based, in part, on the indicated power adjustment state.

In yet some other aspects, method 1400 may include receiving radio resource control (RRC) signaling. In this aspect, the RRC signaling may include one or more parameters to configure the UE to recognize at least one of TPC commands for PUSCH and TPC commands for SRS including the first or second TPC commands. In turn, the UE may then configure power control for at least one of PUSCH and SRS transmissions based on the received one or more parameters.

Of yet further note, method 1400 may also include operation in the situation where the DCI comprises non-scheduling DCI configured for triggering transmission of at least one of the one or more sounding reference signal (SRS) resource sets at a first time, such as was illustrated in FIG. 9A, 9B, or 10. In this case, the method also includes receiving at least one scheduling DCI prior to the first time, wherein the at least one scheduling DCI includes a further TPC command. The UE may then respond to the further TPC command based on a predetermined setting. In one example, responding to the further TPC command includes either ignoring the further TPC command based on the predetermined setting or accumulating the further TPC command based on the predetermined setting. Additionally, the non-scheduling downlink control information (DCI) may include a one-time power adjusting DCI used with a closed loop power control process for a corresponding triggered transmission of the sounding reference signal (SRS) resource set. Here, the UE may then configure the SRS resource set with the further TPC command based on a predetermined configuration that is further based on a power control power adjustment state of the PUSCH.

Figure 15:
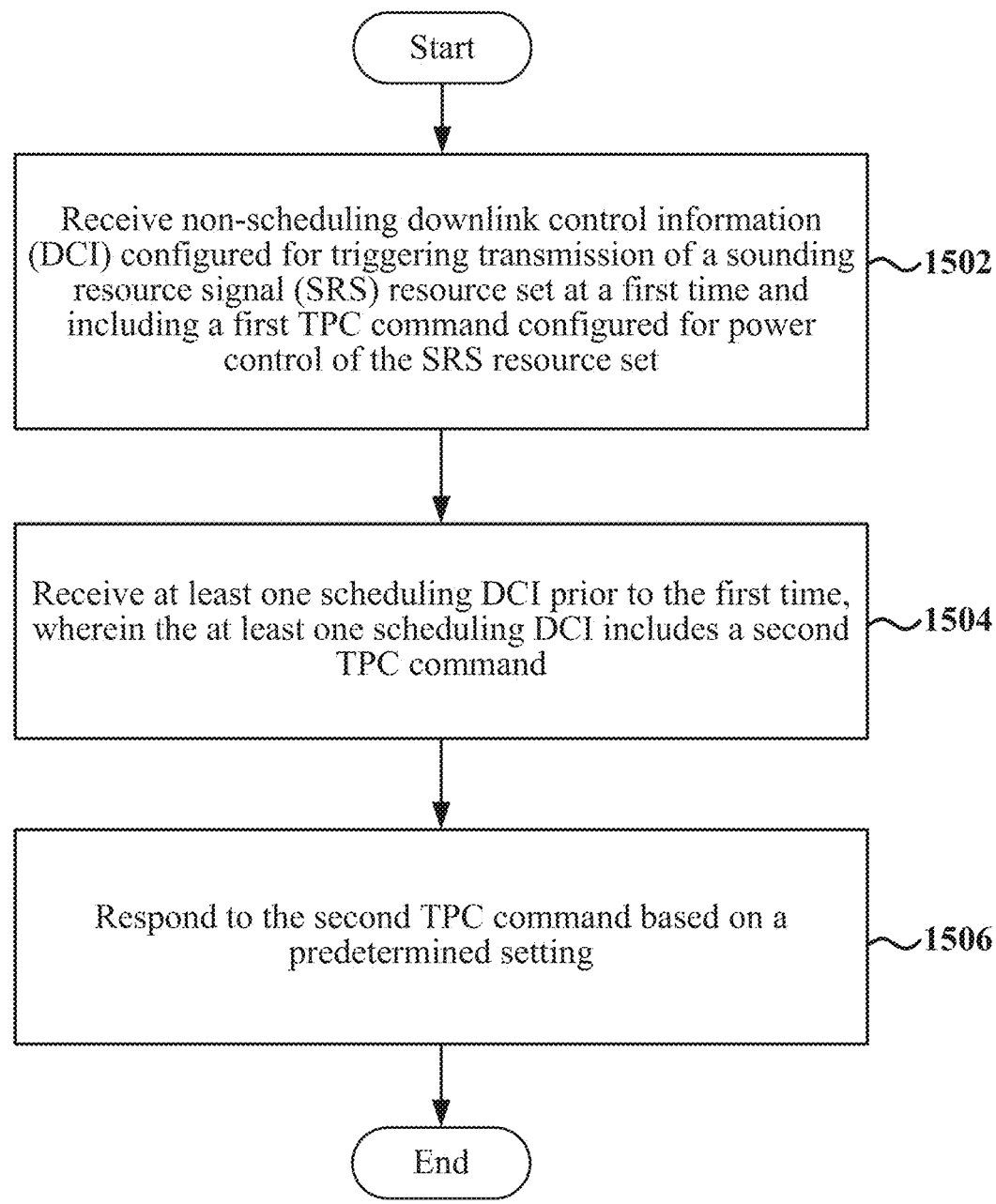
FIG. 15 is a flow chart illustrating another example of a method for communication in a UE according to some aspects.

FIG. 15 is a flow chart illustrating an example wireless communication method 1400 according to some aspects of the disclosure. As described herein, some or all illustrated features may be omitted in a particular implementation within the scope of the present disclosure, and some illustrated features may not be required for implementation of all embodiments. In some examples, the method 1500 may be carried out by the UE 1300 illustrated in FIG. 13. In some examples, the method 1500 may be carried out by any suitable apparatus or means for carrying out the functions or algorithm described below.

At block 1502, the UE may receive non-scheduling downlink control information (DCI), the non-scheduling DCI configured for triggering transmission of a sounding reference signal (SRS) resource set at a first time and including a first TPC command configured for power control of the SRS resource set. Next at block 1504, the UE may receive at least one scheduling DCI prior to the first time, wherein the at least one scheduling DCI includes a second TPC command. Finally, method 1500 includes responding to or acting upon the second TPC command based on a predetermined setting as shown in block 1506. In aspects, the response to the second TPC command includes ignoring the second TPC command based on the predetermined setting. In another aspect, the response to the second TPC command includes accumulating the second TPC command based on the predetermined setting, such as was discussed in connection with FIG. 9 above.

In yet other aspects, method 1500 may include accumulating a plurality of TPC commands for each of respective plurality of scheduling DCI received prior to the first time. In other aspects, method 1500 may include that the non-scheduling downlink control information (DCI) includes a one-time power adjusting DCI used with a closed loop power control process for a corresponding triggered transmission of the sounding reference signal (SRS) resource set, and the UE configures the SRS resource set with a TPC command based on a predetermined configuration. In yet a further aspect, the predetermined configuration includes using a same power control power adjustment state as a physical uplink shared channel (PUSCH). In another example, the predetermined configuration includes using a different power control power adjustment state from a PUSCH.

Of further note, the present disclosure may include the following further aspects of the present disclosure.

Aspect 1: A method for communication at a base station comprising: configuring downlink control information (DCI) to include a plurality of transmit power control (TPC) commands including: a first TPC command of the plurality of TPC commands configured for power control of a physical uplink shared channel (PUSCH); and a second TPC command of the plurality of TPC commands configured for power control of one or more sounding reference signal (SRS) resource sets; and prepare the DCI for transmission to at least one user equipment (UE).

Aspect 2: The method of aspect 1, wherein the DCI is a non-scheduling DCI configured to trigger the one or more SRS resource sets.

Aspect 3: The method of either aspect 1 or aspect 2, wherein at least the second TPC command is placed in reused bitfields of the non-scheduling DCI, wherein the reused bitfields comprise one or more bitfields that are configured in a scheduling DCI for scheduling of transmission resources.

Aspect 4: The method of any of aspects 1 through 3, wherein the one or more SRS resource sets are aperiodic SRS resource sets triggered by the DCI.

Aspect 5: The method of any of aspects 1 through 4, wherein the DCI further includes an indication of a power adjustment state for the second TPC command configured for power control of the one or more SRS resource sets.

Aspect 6: The method of aspect 5, wherein the indication of the power adjustment state further comprises configuring the DCI to include the second TPC command comprising a first bitfield with the second TPC command and a first power adjustment state and a second bitfield with the second TPC command and a second power adjustment state.

Aspect 7: The method of aspect 5, wherein the indication of the power adjustment state includes signaling or a configuration communicated to the UE to allow the UE to derive the power adjustment state based on at least one predetermined condition or setting, wherein the at least one predetermined condition or setting comprises a predetermination that the second TPC command is applicable to both of two available power adjustment states.

Aspect 8: The method of aspect 7, wherein that at least one predetermined condition or setting comprises applying the second TPC command with a power adjustment state associated with the power adjustment state corresponding to either a larger or smaller number of triggered SRS resource sets of multiple triggered SRS resource sets or to either a larger or smaller set identifier (set ID) of triggered SRS resource sets of the multiple triggered SRS resource sets.

Aspect 9: The method of any of aspects 1 through 8, wherein the DCI includes an SRS resource indicator (SRI) bitfield.

Aspect 10: The method of any of aspects 1 through 8, wherein the DCI includes a power adjustment state indication for the first TPC command without an SRS resource indicator (SRI).

Aspect 11: The method of aspect 10, wherein the power adjustment state indication further comprises configuring the DCI to include the first TPC command comprising a first bitfield with the first TPC command and a first power adjustment state and a second bitfield with the first TPC command and a second power adjustment state.

Aspect 12: The method of any of aspects 1 through 11, wherein the DCI is further configured to indicate one or more TPC commands for each component carrier (CC) in a CC set.

Aspect 13: A network entity comprising: a processor configured to: configure downlink control information (DCI) to include a plurality of transmit power control (TPC) commands including: a first TPC command of the plurality of TPC commands configured for power control of a physical uplink shared channel (PUSCH); and a second TPC command of the plurality of TPC commands configured for power control of one or more sounding reference signal (SRS) resource sets; and prepare the DCI for transmission to at least one user equipment (UE).

Aspect 14: The network entity of aspect 13, wherein the DCI is a non-scheduling DCI configured to trigger the one or more SRS resource sets.

Aspect 15: A method for communication at a user equipment (UE) comprising: processing downlink control information (DCI) received from a network entity, the DCI comprising a plurality of transmit power control (TPC) commands including: a first TPC command of the plurality of TPC commands configured for power control of a physical uplink shared channel (PUSCH); and a second TPC command of the plurality of TPC commands configured for power control of one or more sounding reference signal (SRS) resource sets; and configuring resources for at least one of PUSCH and SRS transmissions based on the first or second TPC commands.

Aspect 16: The method of aspect 15, wherein the DCI is a non-scheduling DCI configured to trigger the one or more SRS sets in the UE.

Aspect 17: The method of either of aspects 15 or 16, wherein at least the second TPC command is placed in reused bitfields of the non-scheduling DCI, wherein the reused bitfields comprise one or more bitfields that are configured in a scheduling DCI for scheduling of transmission resources.

Aspect 18: The method of any of aspects 15 through 17, wherein the one or more SRS sets are aperiodic SRS sets triggered by the DCI.

Aspect 19: The method of any of aspects 15 through 18, further comprising: setting the transmission power of the PUSCH and SRS resource sets based respectively on the first and second TPC commands; and transmitting the PUSCH and SRS resource sets; wherein the first and second TPC commands are configured to implement the same power control for each of the PUSCH and the one or more SRS resource sets in the UE.

Aspect 20: The method of any of aspects 15 through 18, further comprising: setting the transmission power of the PUSCH and SRS resource sets based respectively on the first and second TPC commands; and transmitting the PUSCH and SRS resource sets; wherein the first and second TPC commands are configured to implement a different power control for each of the respective PUSCH and the one or more SRS resource sets.

Aspect 21: The method of any of aspects 15 through 20, wherein the DCI is formatted according to a DCI format 0_1 or a DCI format 0_2.

Aspect 22: The method of any of aspects 15 through 21, wherein the DCI further includes an indication of a power adjustment state for the second TPC command configured for power control of the one or more SRS resource sets; and setting the transmission power of the one or more SRS resource sets based, in part, on the indicated power adjustment state.

Aspect 23: The method of any of aspects 15 through 22, further comprising: deriving the power adjustment state based on characteristics of the second TPC command in the DCI; wherein the indication of the power adjustment state for the second TPC command comprises signaling or a configuration communicated by a base station to the UE configured to allow the UE to derive the power adjustment state.

Aspect 24: The method of aspect 23, wherein the characteristics of the second TPC command include, for a triggered SRS resource set having multiple trigger states, one trigger state of the multiple trigger states designated as the indication for communicating which of two power adjustment states indicator to which the TPC command applies.

Aspect 25: The method of aspect 23, wherein the characteristics of the second TPC command include, for multiple triggered SRS resource sets, a configuration wherein all of the multiple triggered sets are configured with a same power adjustment state indicates that the second TPC command applies to the same power adjustment state.

Aspect 26: The method of any of aspects 15 through 25, further comprising: configuring power control for at least one of PUSCH and SRS transmissions based on one or more parameters in received radio resource control (RRC) signaling, the RRC signaling including the one or more parameters to configure the UE to recognize at least one of TPC commands for PUSCH and TPC commands for SRS including the first or second TPC commands.

Aspect 27: The method of any of aspects 15 through 26, wherein the DCI comprises non-scheduling DCI configured for triggering transmission of at least one of the one or more sounding reference signal (SRS) resource sets at a first time, the method further comprising: receiving at least one scheduling DCI prior to the first time, wherein the at least one scheduling DCI includes a further TPC command; and responding to the further TPC command based on a predetermined setting.

Aspect 28: The method of aspect 27, wherein the responding to the further TPC command comprises one of ignoring the further TPC command based on the predetermined setting or accumulating the further TPC command based on the predetermined setting.

Aspect 29: The method of claim 27, further comprising: the non-scheduling downlink control information (DCI) comprising a one-time power adjusting DCI used with a closed loop power control process for a corresponding triggered transmission of the sounding reference signal (SRS) resource set; wherein the UE configures the SRS resource set with the further TPC command based on a predetermined configuration that is further based on a power control power adjustment state of the PUSCH.

Aspect 30: A user equipment, comprising: a transceiver; a memory; and a processor communicatively coupled to the transceiver and the memory, wherein the processor is configured to: receive downlink control information (DCI) configured to include a plurality of transmit power control (TPC) commands including: a first TPC command of the plurality of TPC commands configured for power control of a physical uplink shared channel (PUSCH); and a second TPC command of the plurality of TPC commands configured for power control of one or more sounding reference signal (SRS) resource sets; configure resources for at least one of PUSCH and SRS transmissions based on the first or second TPC commands; and transmit the configured resources for at least one of the PUSCH and SRS transmissions.

Aspect 31: An apparatus configured for wireless communication comprising at least one means for performing a method of any one of aspects 1 through 12 or aspects 15 through 29.

Aspect 32: A non-transitory computer-readable medium storing computer-executable code, comprising code for causing an apparatus to perform a method of any one of aspects 1 through 12 or aspects 15 through 29.

Several aspects of a wireless communication network have been presented with reference to an example implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing Institute of Electrical and Electronics Engineers (IEEE) 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure. As used herein, the term "determining" may encompass a wide variety of actions. For example, "determining" may include calculating, computing, processing, deriving, investigating, looking up (e.g., looking up in a table, a database or another data structure), ascertaining, resolving, selecting, choosing, establishing, receiving (e.g., receiving information), accessing (e.g., accessing data in a memory), and the like.

One or more of the components, steps, features and/or functions illustrated in FIGS. 1-15 may be rearranged and/or combined into a single component, step, feature or function or embodied in several components, steps, or functions. Additional elements, components, steps, and/or functions may also be added without departing from novel features disclosed herein. The apparatus, devices, and/or components illustrated in any of FIGS. 1-15 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of example processes. Based upon design preferences, it is understood that the specific order or hierarchy of steps in the methods may be rearranged. The accompanying method claims present elements of the various steps in a sample order and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A method for communication at a base station comprising:
configuring downlink control information (DCI) to include a plurality of transmit power control (TPC) commands including:
a first TPC command of the plurality of TPC commands configured for power control of a physical uplink shared channel (PUSCH); and
a second TPC command of the plurality of TPC commands configured for power control of one or more sounding reference signal (SRS) resource sets; and
preparing the DCI for transmission to at least one user equipment (UE), wherein the DCI further includes an indication of a power adjustment state for the second TPC command configured for power control of the one or more SRS resource sets.

2. The method of claim 1, wherein the DCI is a non-scheduling DCI configured to trigger the one or more SRS resource sets.

3. The method of claim 2, wherein at least the second TPC command is placed in reused bitfields of the non-scheduling DCI, wherein the reused bitfields comprise one or more bitfields that are configured in a scheduling DCI for scheduling of transmission resources.

4. The method of claim 2, wherein the one or more SRS resource sets are aperiodic SRS resource sets triggered by the DCI.

5. The method of claim 1, wherein the indication of the power adjustment state further comprises configuring the DCI to include the second TPC command comprising a first bitfield with the second TPC command and a first power adjustment state and a second bitfield with the second TPC command and a second power adjustment state.

6. The method of claim 1, wherein the indication of the power adjustment state includes signaling or a configuration communicated to the UE to allow the UE to derive the power adjustment state based on at least one predetermined condition or setting, wherein the at least one predetermined condition or setting comprises a predetermination that the second TPC command is applicable to both of two available power adjustment states.

7. The method of claim 6, wherein that at least one predetermined condition or setting comprises applying the second TPC command with a power adjustment state associated with the power adjustment state corresponding to either a larger or smaller number of triggered SRS resource sets of multiple triggered SRS resource sets or to either a larger or smaller set identifier (set ID) of triggered SRS resource sets of the multiple triggered SRS resource sets.

8. The method of claim 1, wherein the DCI includes an SRS resource indicator (SRI) bitfield.

9. The method of claim 1, wherein the DCI includes a power adjustment state indication for the first TPC command without an SRS resource indicator (SRI).

10. The method of claim 9, wherein the power adjustment state indication further comprises configuring the DCI to include the first TPC command comprising a first bitfield with the first TPC command and a first power adjustment state and a second bitfield with the first TPC command and a second power adjustment state.

11. The method of claim 1, wherein the DCI is further configured to indicate one or more TPC commands for each component carrier (CC) in a CC set.

12. A network entity comprising:
a processor configured to:
configure downlink control information (DCI) to include a plurality of transmit power control (TPC) commands including:
a first TPC command of the plurality of TPC commands configured for power control of a physical uplink shared channel (PUSCH); and
a second TPC command of the plurality of TPC commands configured for power control of one or more sounding reference signal (SRS) resource sets; and
prepare the DCI for transmission to at least one user equipment (UE), wherein the DCI further includes an indication of a power adjustment state for the second TPC command configured for power control of the one or more SRS resource sets.

13. The network entity of claim 12, wherein the DCI is a non-scheduling DCI configured to trigger the one or more SRS resource sets.

14. A method for communication at a user equipment (UE) comprising:
processing downlink control information (DCI) received from a network entity, the DCI comprising a plurality of transmit power control (TPC) commands including:
a first TPC command of the plurality of TPC commands configured for power control of a physical uplink shared channel (PUSCH); and a second TPC command of the plurality of TPC commands configured for power control of one or more sounding reference signal (SRS) resource sets, wherein the DCI further includes an indication of a power adjustment state for the second TPC command configured for power control of the one or more SRS resource sets; and configuring resources for at least one of PUSCH and SRS transmissions based on the first or second TPC commands.

15. The method of claim 14, wherein the DCI is a non-scheduling DCI configured to trigger the one or more SRS sets in the UE.

16. The method of claim 15, wherein at least the second TPC command is placed in reused bitfields of the non-scheduling DCI, wherein the reused bitfields comprise one or more bitfields that are configured in a scheduling DCI for scheduling of transmission resources.

17. The method of claim 15, wherein the one or more SRS sets are aperiodic SRS sets triggered by the DCI.

18. The method of claim 14, further comprising:
setting a transmission power of the PUSCH and SRS resource sets based respectively on the first and second TPC commands; and
transmitting the PUSCH and SRS resource sets;
wherein the first and second TPC commands are configured to implement the same power control for each of the PUSCH and the one or more SRS resource sets in the UE.

19. The method of claim 14, further comprising:
setting a transmission power of the PUSCH and SRS resource sets based respectively on the first and second TPC commands; and
transmitting the PUSCH and SRS resource sets;
wherein the first and second TPC commands are configured to implement a different power control for each of the respective PUSCH and the one or more SRS resource sets.

20. The method of claim 14, wherein the DCI is formatted according to a DCI format 0_1 or a DCI format 0_2.

21. The method of claim 14, further comprising, setting a transmission power of the one or more SRS resource sets based, in part, on the indicated power adjustment state.

22. The method of claim 21, further comprising:
deriving the power adjustment state based on characteristics of the second TPC command in the DCI;
wherein the indication of the power adjustment state for the second TPC command comprises signaling or a configuration communicated by a base station to the UE configured to allow the UE to derive the power adjustment state.

23. The method of claim 22, wherein the characteristics of the second TPC command include, for a triggered SRS resource set having multiple trigger states, one trigger state of the multiple trigger states designated as the indication for communicating which of two power adjustment states indicator to which the TPC command applies.

24. The method of claim 22, wherein the characteristics of the second TPC command include, for multiple triggered SRS resource sets, a configuration wherein all of the multiple triggered sets are configured with a same power adjustment state indicates that the second TPC command applies to the same power adjustment state.

25. The method of claim 14, further comprising:
configuring power control for at least one of PUSCH and SRS transmissions based on one or more parameters in received radio resource control (RRC) signaling, the RRC signaling including the one or more parameters to configure the UE to recognize at least one of TPC commands for PUSCH and TPC commands for SRS including the first or second TPC commands.

26. The method of claim 14, wherein the DCI comprises non-scheduling DCI configured for triggering transmission of at least one of the one or more sounding reference signal (SRS) resource sets at a first time, the method further comprising:
receiving at least one scheduling DCI prior to the first time, wherein the at least one scheduling DCI includes a further TPC command; and
responding to the further TPC command based on a predetermined setting.

27. The method of claim 26, wherein the responding to the further TPC command comprises one of ignoring the further TPC command based on the predetermined setting or accumulating the further TPC command based on the predetermined setting.

28. The method of claim 26, further comprising:
the non-scheduling downlink control information (DCI) comprising a one-time power adjusting DCI used with a closed loop power control process for a corresponding triggered transmission of at least one of the one or more sounding reference signal (SRS) resource sets;
wherein the UE configures the at least one of the one or more SRS resource sets with the further TPC command based on a predetermined configuration that is further based on a power control power adjustment state of the PUSCH.

29. A user equipment, comprising:
a transceiver;
a memory; and
a processor communicatively coupled to the transceiver and the memory, wherein the processor is configured to:
receive downlink control information (DCI) configured to include a plurality of transmit power control (TPC) commands including:
a first TPC command of the plurality of TPC commands configured for power control of a physical uplink shared channel (PUSCH); and
a second TPC command of the plurality of TPC commands configured for power control of one or more sounding reference signal (SRS) resource sets, wherein the DCI further includes an indication of a power adjustment state for the second TPC command configured for power control of the one or more SRS resource sets;
configure resources for at least one of PUSCH and SRS transmissions based on the first or second TPC commands; and
transmit the configured resources for at least one of the PUSCH and SRS transmissions.

* * * * *